INVENTORS
ROBERT R. SEEBER JR.
ARTHUR J. SCRIVER JR.
BY Melvin P. Williams
AGENT June 22, 1965 R. R. SEEBER, JR., ETAL 3,191,155

LOGICAL CIRCUITS AND MEMORY

Filed Aug. 22, 1960

19 Sheets-Sheet 3

June 22, 1965 R. R. SEEBER, JR., ETAL 3,191,155

LOGICAL CIRCUITS AND MEMORY

Filed Aug. 22, 1960 19 Sheets-Sheet 11

June 22, 1965 R. R. SEEBER, JR., ETAL 3,191,155

LOGICAL CIRCUITS AND MEMORY

Filed Aug. 22, 1960 19 Sheets-Sheet 13

June 22, 1965 R. R. SEEBER, JR., ETAL 3,191,155

LOGICAL CIRCUITS AND MEMORY

Filed Aug. 22, 1960 19 Sheets-Sheet 14

3,191,155
Patented June 22, 1965

3,191,155
LOGICAL CIRCUITS AND MEMORY

Robert R. Seeber, Jr., Poughkeepsie, and Arthur J. Scriver, Jr., Wappingers Falls, N.Y., assignors to International Business Machines Corporation, New York, N.Y., a corporation of Delaware Filed Aug. 22, 1960, Ser. No. 51,102
2 Claims. (Cl. 340—172.5)

Figures 1, 1A:
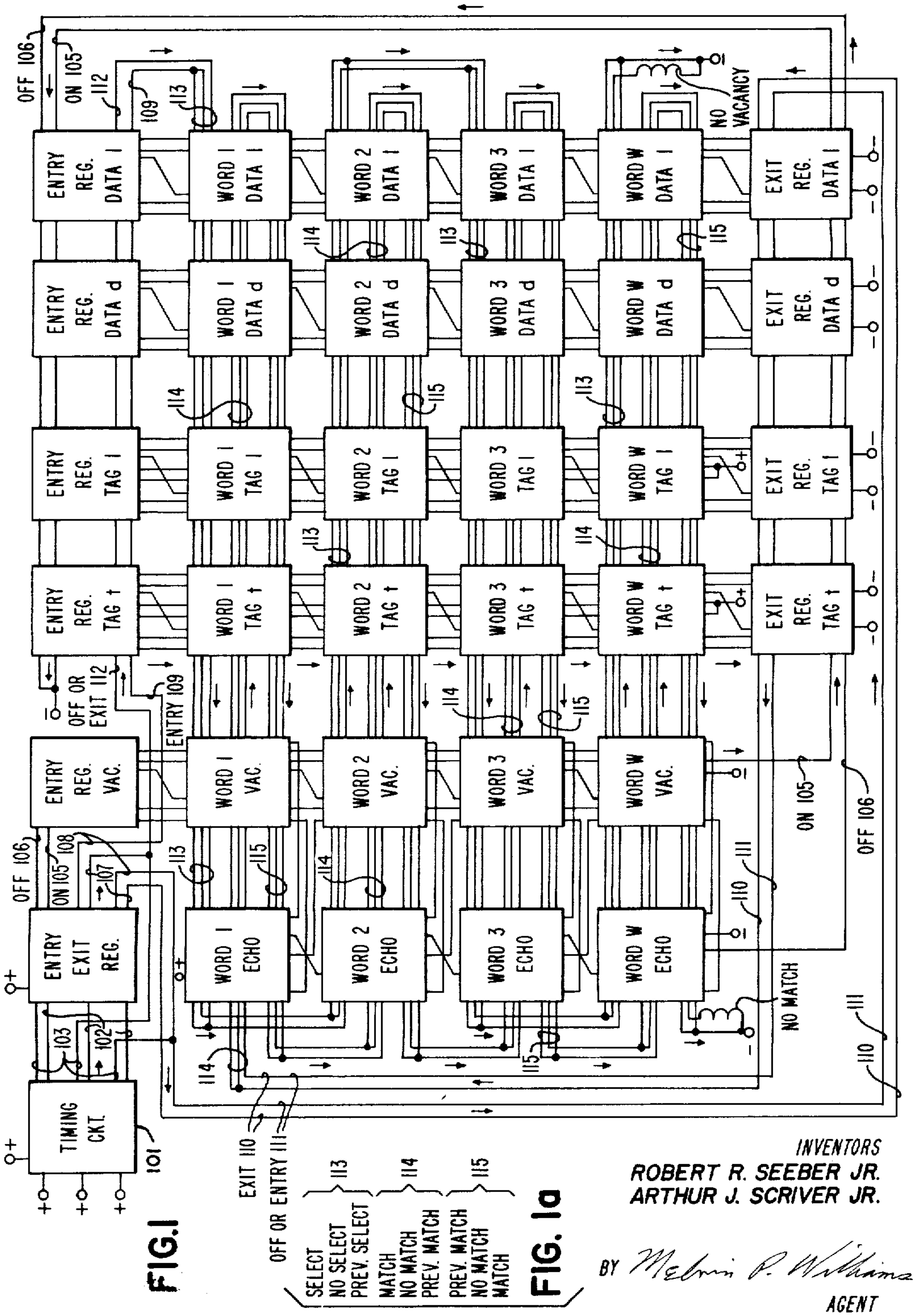

This invention relates to logical circuits of the kind useful in data processing, and more particularly to logical circuits in an associative memory system.

Associative memory systems are those in which a unit of data, such as a word, is identified for retrieval by specifying the information content of an arbitrary portion of the word structure, known as the "tag" of the word, which may extend over the entire word or only a part thereof.

The most common type of associative memory systems contain a plurality of word registers, each register comprising storage locations for a plurality of bits, the system being adapted to receive words of information serially, the bits of each word being trmansmitted in parallel. As is known in the associative memory art, it is possible to have each word register identify itself as either occupied or vacant, so that data may be placed into word registers which are vacant. Thus, in the present state of the art, associative memories have vacancy responsive means to control the storage of data, and tag comparing means to control the retrieval of data, and are capable of satisfactorily performing the necessary storage and retrieval functions. However, in order to achieve maximum utilization of the associative type of memory system, the storage and retrieval of information performed in dependence only upon vacancy status of registers and tag comparison of words is insufficient. Maximum adaptability of data handling can be achieved only if additional controls over the operation of the memory are provided. The large numbers of data bits and word registers needed to provide a useful associative memory requires that the means employed be extremely simple, inexpensive and of low power consumption; the provision of additional control functions accentuates these requirements. In order to provide simple arrangements of logical elements which lend themselves to practical production techniques, only the most refined logical circuits can be employed.

It is an object of this invention to provide an associative memory apparatus in which information having common tags and an additional sequential relationship can be stored and retrieved while preserving said sequential relationship.

Other objects of the invention include the following:

To provide an associative memory system having sequentially responsive word registers;

To provide an associative memory system in which the retrieval of information is controlled in part by the sequence in which information is stored in said system;

To provide an associative memory system in which information having like tags can be retrieved on a first-in/first-out basis;

To provide an associative memory system in which information may be retrieved from a sequence of word registers in turn, each supplying information and thereafter rendering the next word register in sequence operative to read out information, in dependence upon having the proper tag;

To provide an associative memory system in which each word register in a sequence of word registers is controlled in part by the vacancy and tag-comparison status of the word registers antecedent thereto;

To provide an associative memory system, employing current gates, comprised of a plurality of word registers each having a fixed number of components per word register without regard to the number of word registers contained in said apparatus;

To provide an associative memory system, employing current gates capable of being embodied in any size and yet having a fixed number of control components per word register;

To provide improved logical circuits of the type useful in associative memories;

To provide improved vacancy controlling circuits of the type useful in an associative memory system;

To provide vacancy-controlled tag comparing circuits of the kind useful in controlling an associative memory system;

To provide improved logical circuits responsive to both the vacancy and tag functions in an associative memory system.

Our present invention comprises an associative memory system wherein each one of a sequence of word registers is caused to be interrogated for vacancy or tag comparison purposes in a fixed order, as determined by its position in said sequence. Briefly, the logical circuits of our invention are interconnected in series with one another in such a fashion that comparable logical circuits of subsequent word registers are made operative or rendered responsive in the same sequence as the word registers to which they appertain. The vacant or occupied status of each word register controls the testing for vacancy of each subsequent word register, and the operative fact of match or mismatch during a tag comparing operation of each register will determine whether or not a subsequent register is to be tested for a match.

In accordance with our invention, a repetitive retrieval operation may be performed. In our device, the registers are tested both for vacancy and for matching tags in sequence, so that the first register with the proper tag is read out; after said register has been read out, it will render the next one of a sequence of registers operative to respond (if it contains the proper tag, etc.), so that subsequent read-out operations can be performed on the registers in sequence, and the information retrieved will have the same sequential relationship as the registers in which it was stored. Since selection of the registers in which the information is stored depends on the order in which storage is effected, the sequence of retrieval will directly correspond to the sequence in which information is stired in the apparatus. This permits sequential storage of information as well as sequential retrieval thereof, together providing the possibility of word groupings and maintaining a maximum amount of available storage space within the apparatus. Furthermore, inadvertent use of the same tag information in more than one word will not cause the information content of either register to be lost, it being possible to retrieve the information stored in both word registers in a sequential relationship which renders the identification of the correct word possible.

In one embodiment of our invention, the novel logical circuits are composed of single crossing thin film cryotrons. These cryotrons comprise a gate conductor and a control conductor, both maintained below the temperatures at which the superconductive materials thereof undergo transitions between normal resistivity and superconductive states in the absence of a magnetic field. The control conductor is preferably fabricated of a superconductive material requiring a more intense magnetic field to drive it into a normally resistive state at the operating temperature of the circuit than is required to so drive the superconductive material of the gate conductor. The gating function is achieved by energizing the control conductor with current of a magnitude to apply a sufficient magnetic field to the gate conductor to drive the latter into the resistive state. The details of the particular cryogenic elements used in one embodiment of this invention appear before the detailed description of said embodiment.

The use of this type of element satisfies the cost, space, and power ideals of an associative memory system. However, it being a simple gate (one input, and one controlled path), logical functions can be performed only by combinations thereof. Furthermore, since each gate is always superconducting unless control current is flowing therethrough, any gates which are to be blocked must be affirmatively energized with control current. This contrasts with magnetic core and semiconductor types of logical elements wherein the lack of energization (passive condition) is utilized as the OFF or inactive function in logical circuitry. Similarly, wire-wound cryotrons may be provided with bias coils of a polarity opposite to that of the control coils; when the control coil is energized, it permits current to flow. It is thus seen that the use of single-crossing, thin-film cryogenic elements makes the use of well-known logical arrangements impossible. Since logic is not performed on the basis of selecting one or two elements to be activated, but rather on a basis of selecting all other elements (other than the one or two which are to be "energized") to be deactivated, a great number of selections may be required in a large memory or other data processing apparatus. Our invention encompasses the provision of circuits which may accommodate any number of word registers, each having any number of tag and data bits, without the need for additional cryogenic elements in each register or bit in dependence upon the total number used.

The foregoing and other objects, features, and advantages of our invention will be apparent from the following more particular description of a preferred embodiment thereof as illustrated in the accompanying drawings.

In the drawings:

FIG. 1 is a schematic block diagram of an associative memory system.

FIG. 1*a* is a diagram illustrating the function of a portion of the circuitry in FIG. 1.

Figure 2A:
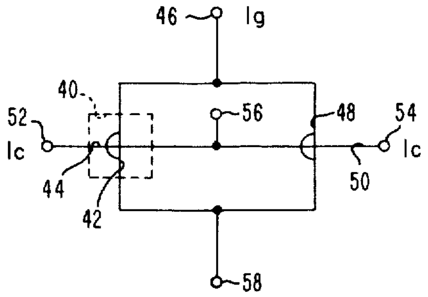

FIG. 2*a* is a schematic diagram of a basic cryogenic circuit.

Figure 2B:
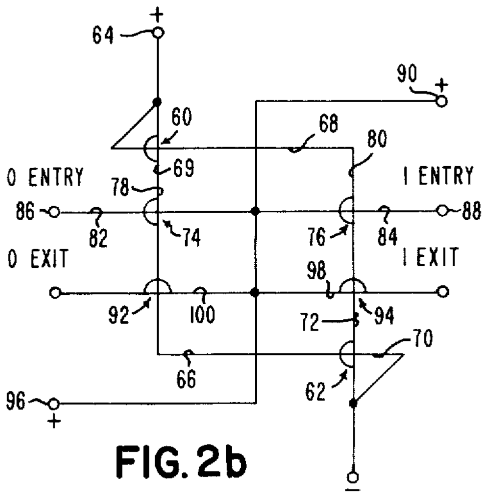

FIG. 2*b* is a schematic diagram of a cryogenic bistable circuit (or trigger).

Figure 3:
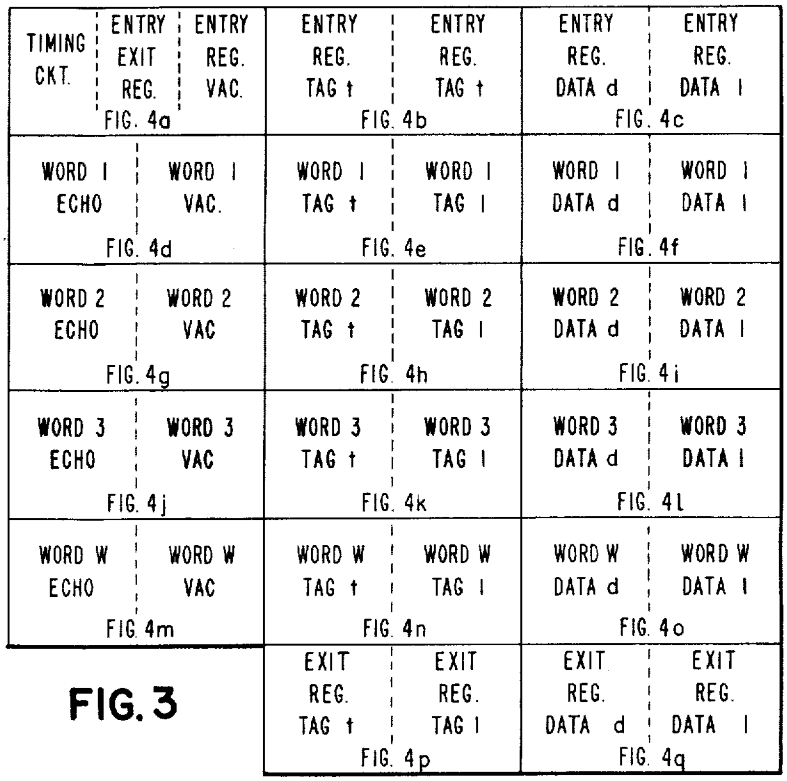
Figure 4A:
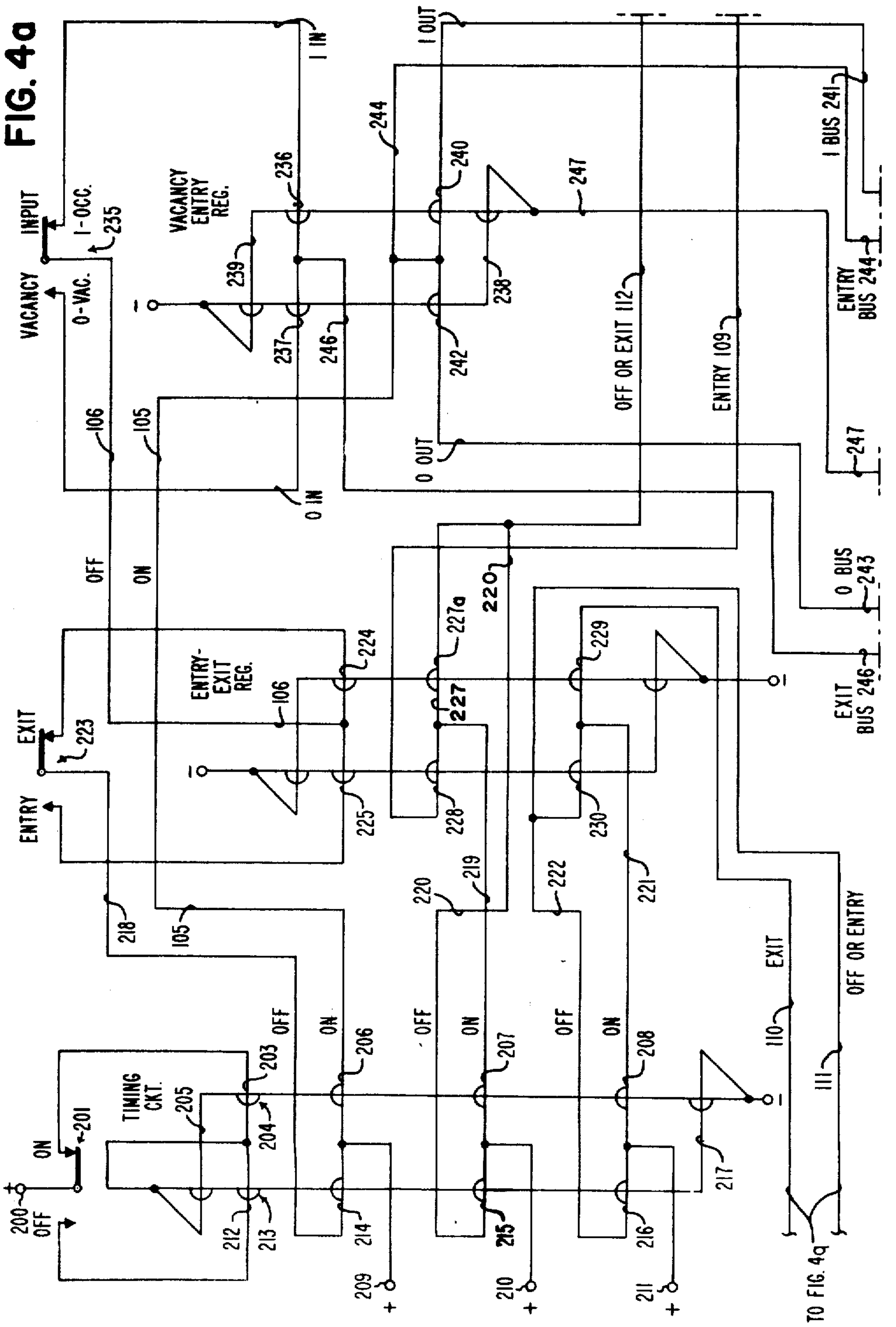
Figure 4B:
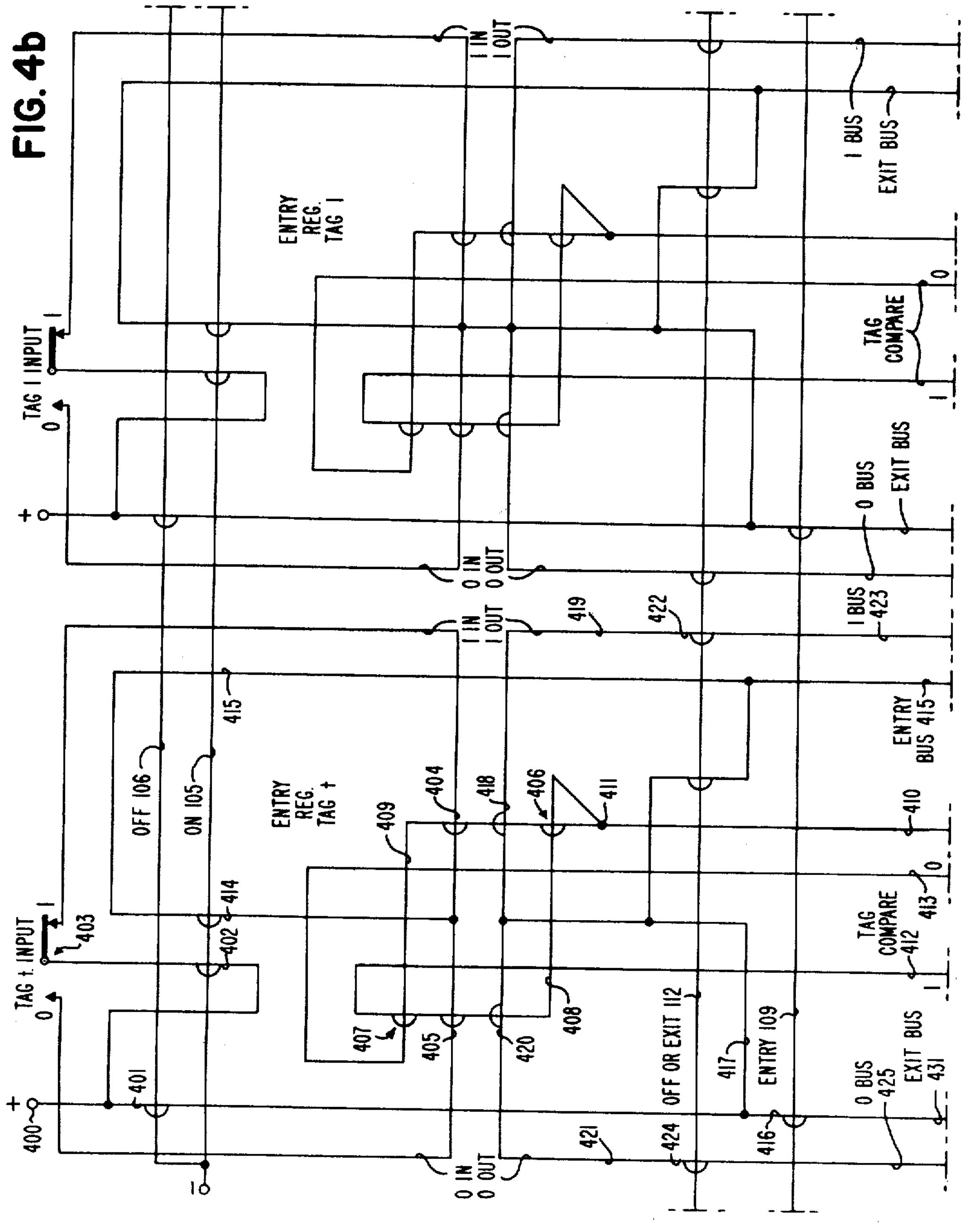
Figure 4C:
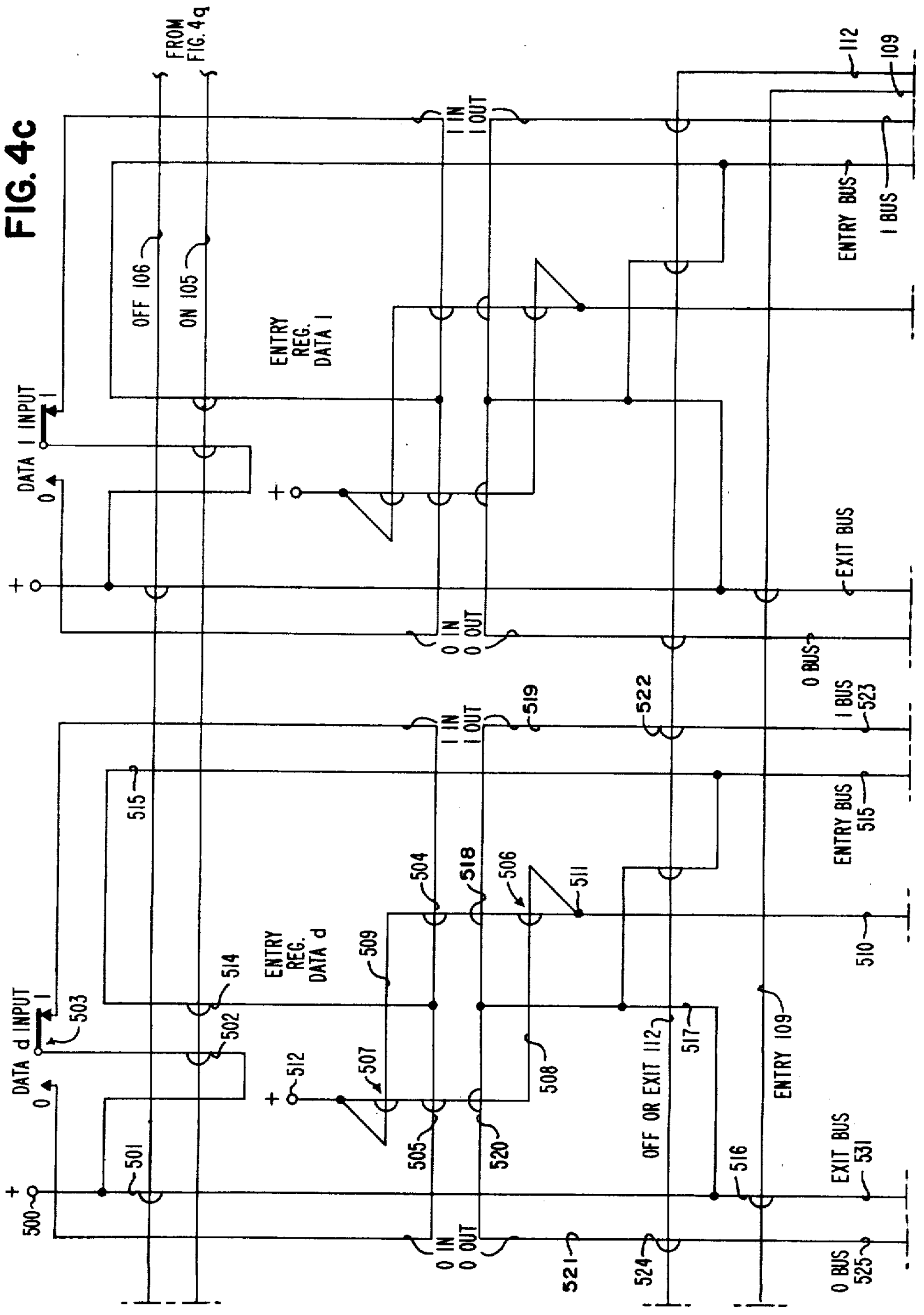
Figure 4D:
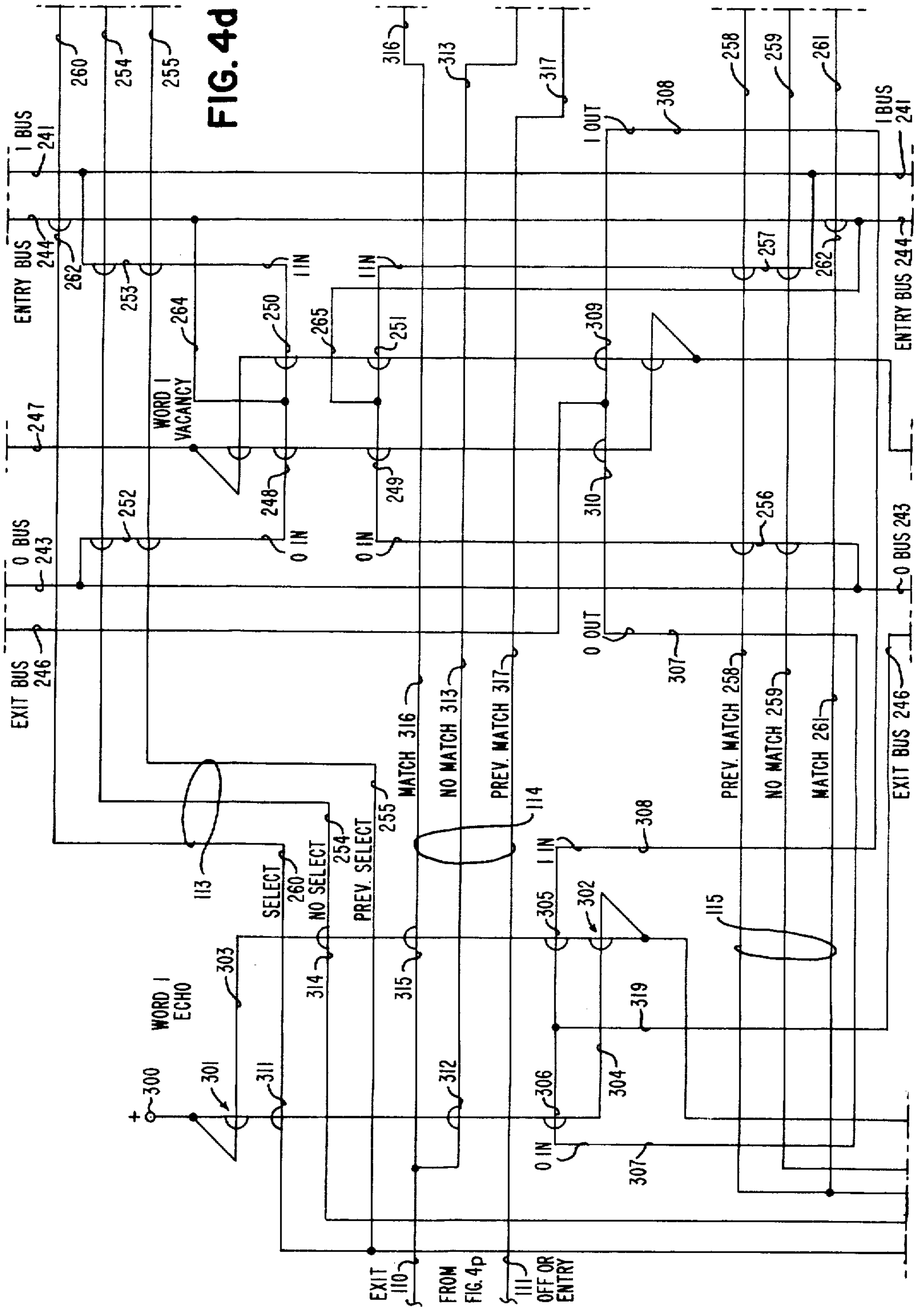
Figure 4E:
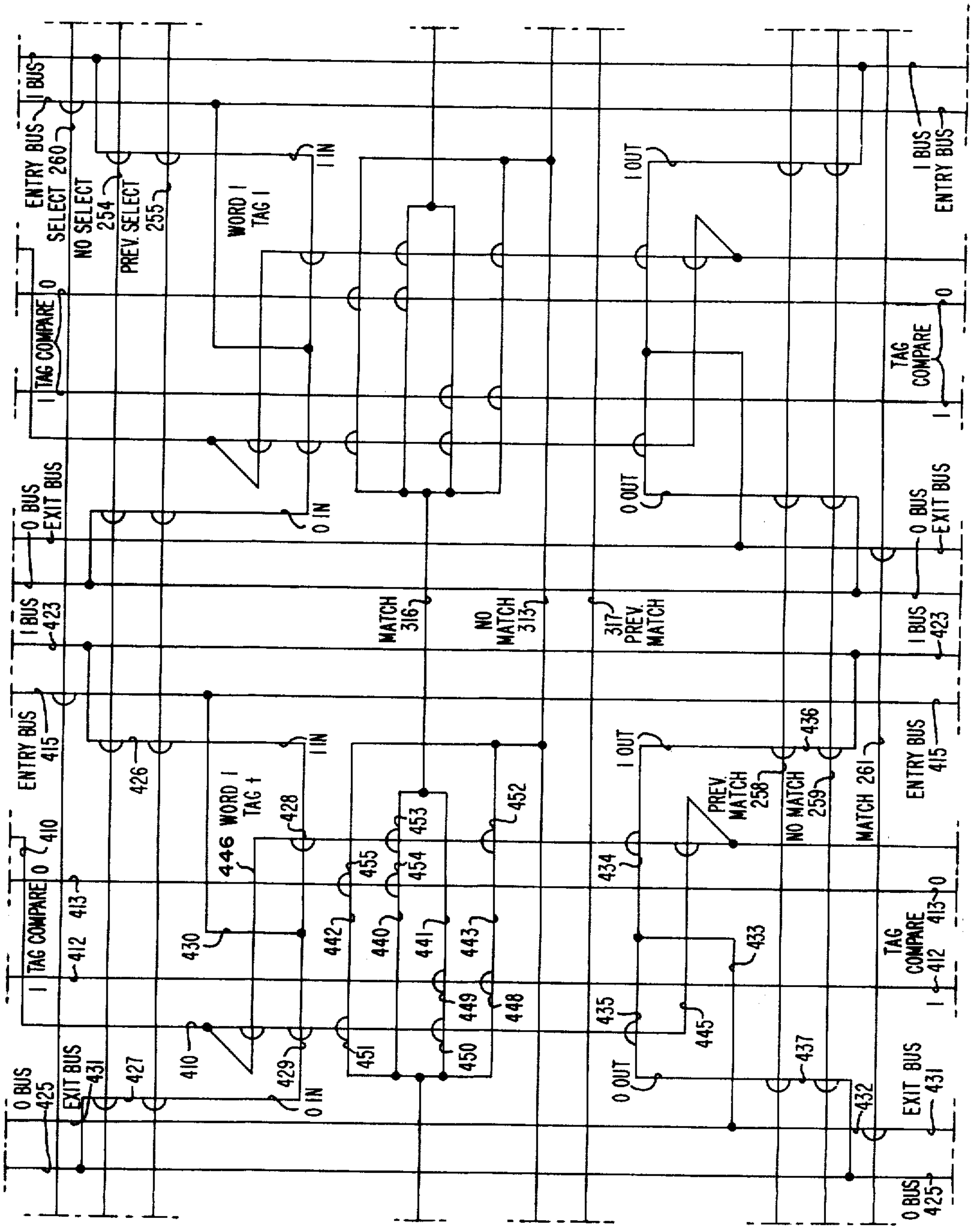
Figure 4F:
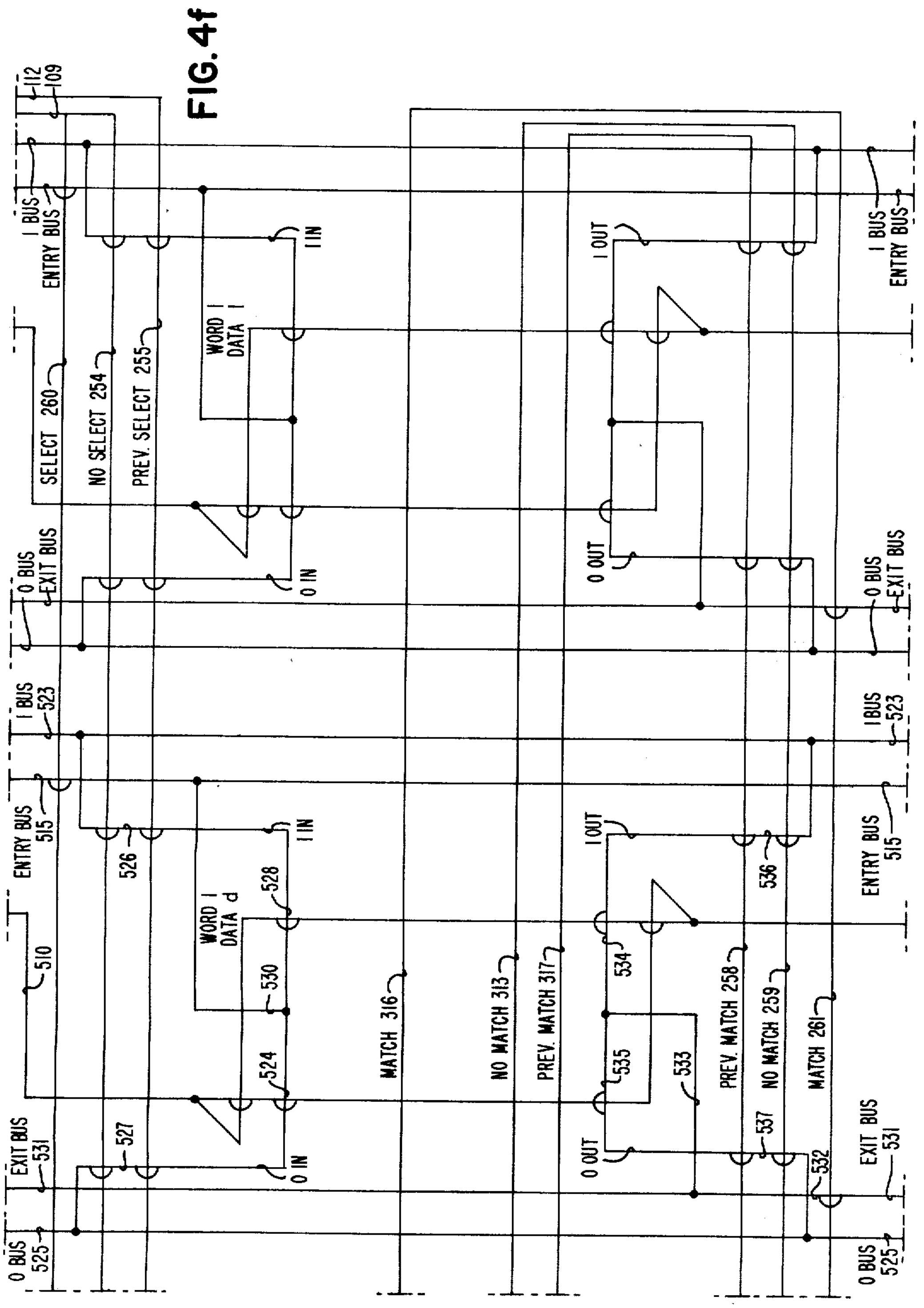
Figure 4G:
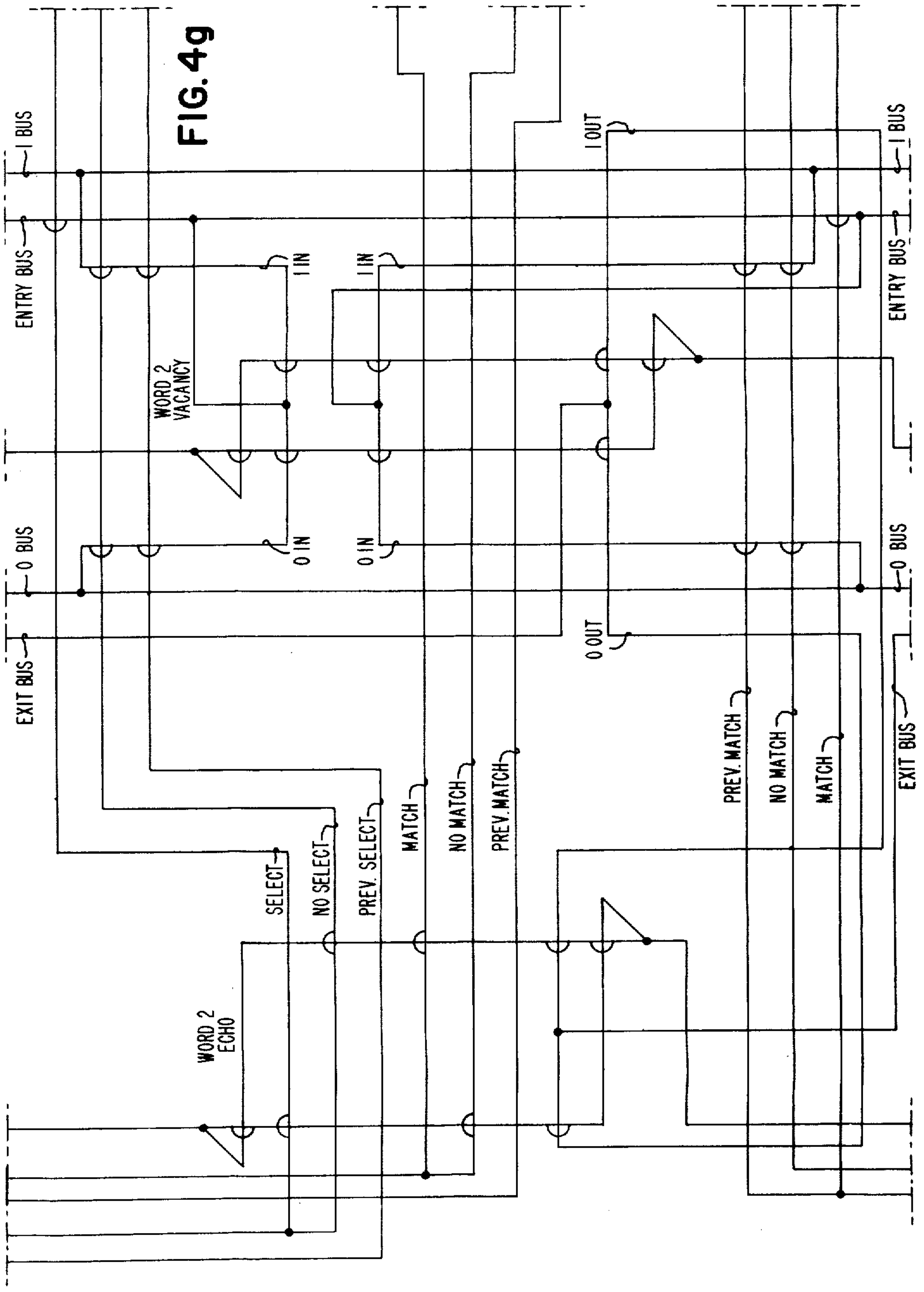
Figure 4H:
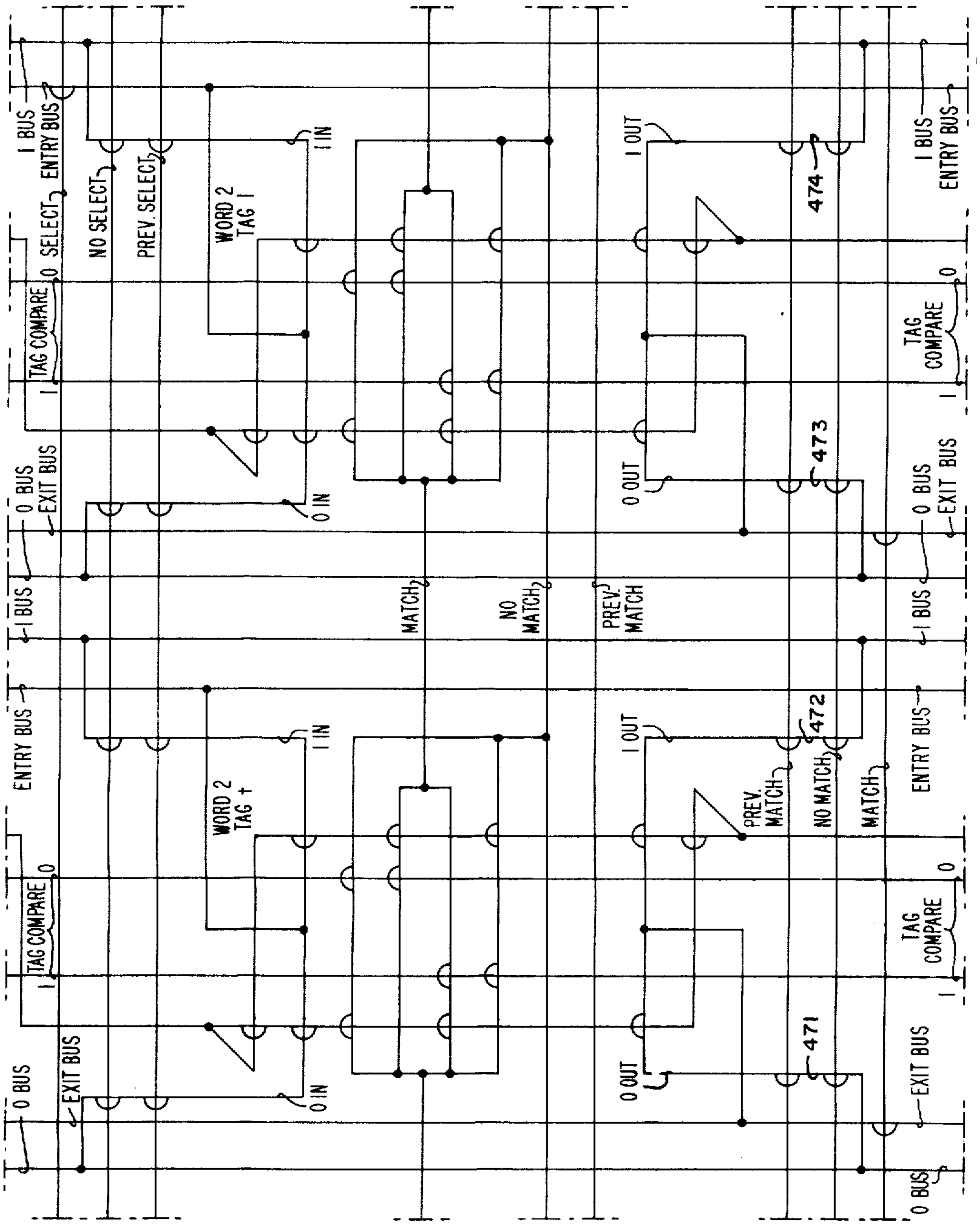
Figure 4I:
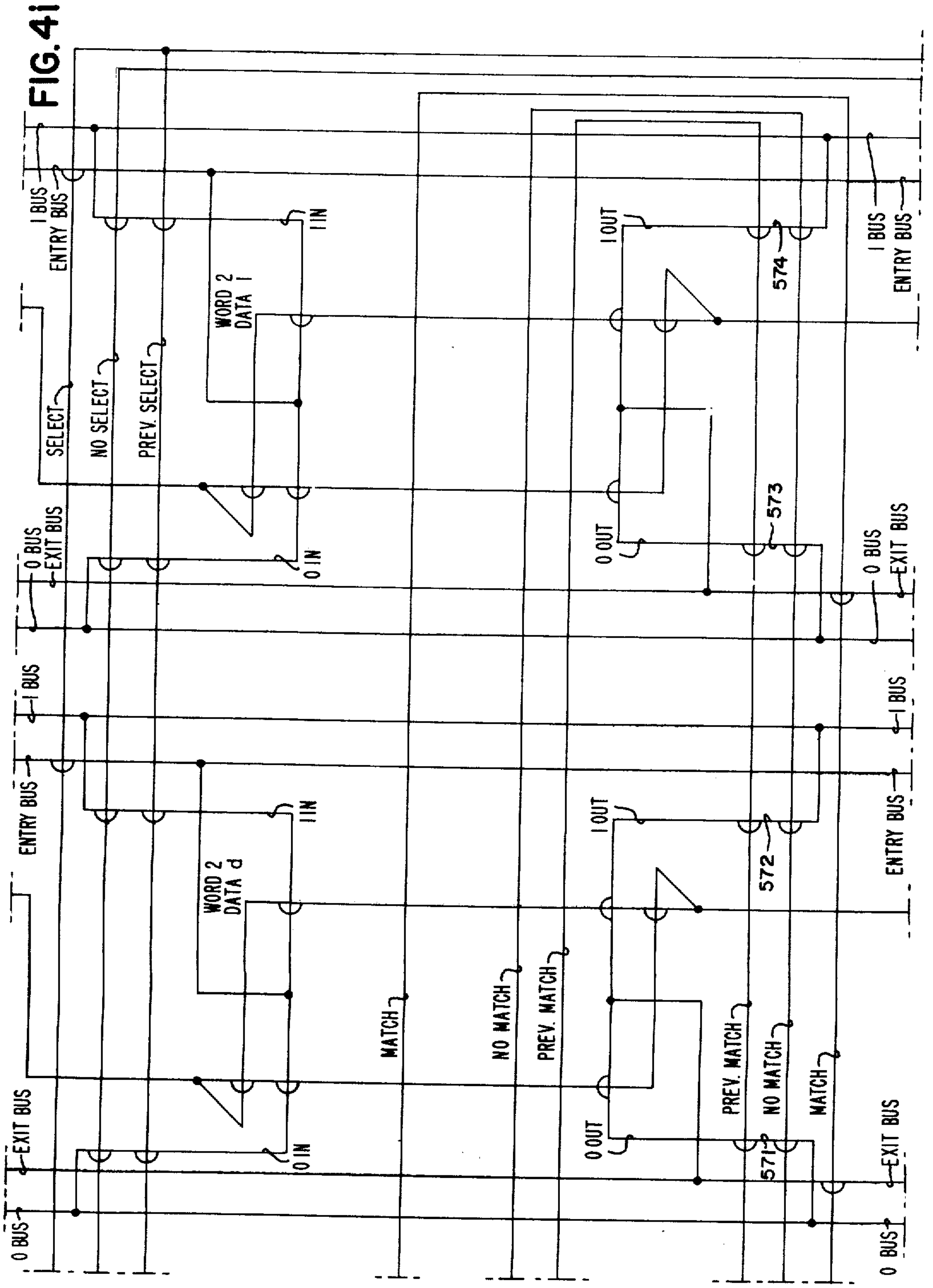
Figure 4J:
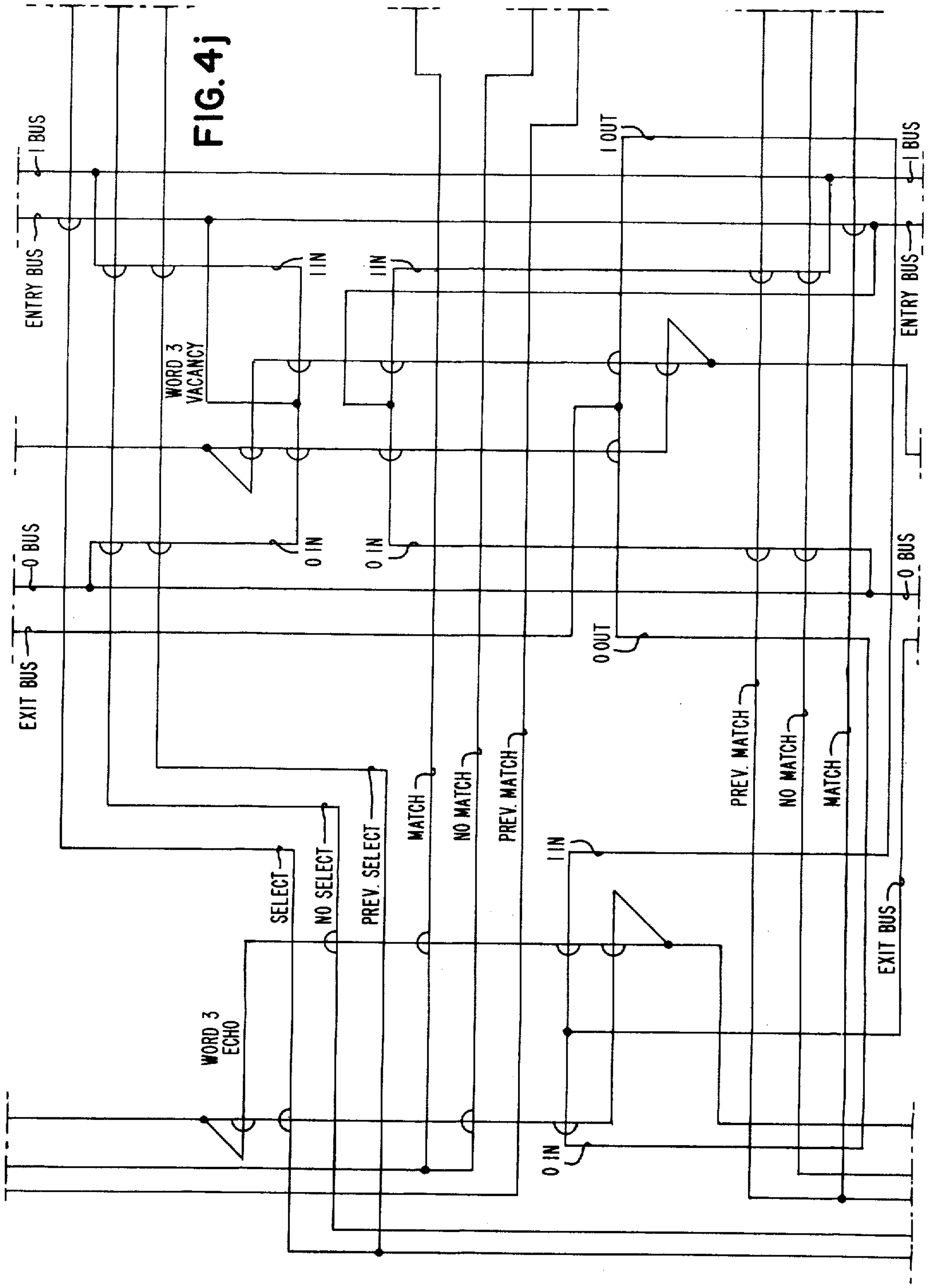
Figure 4K:
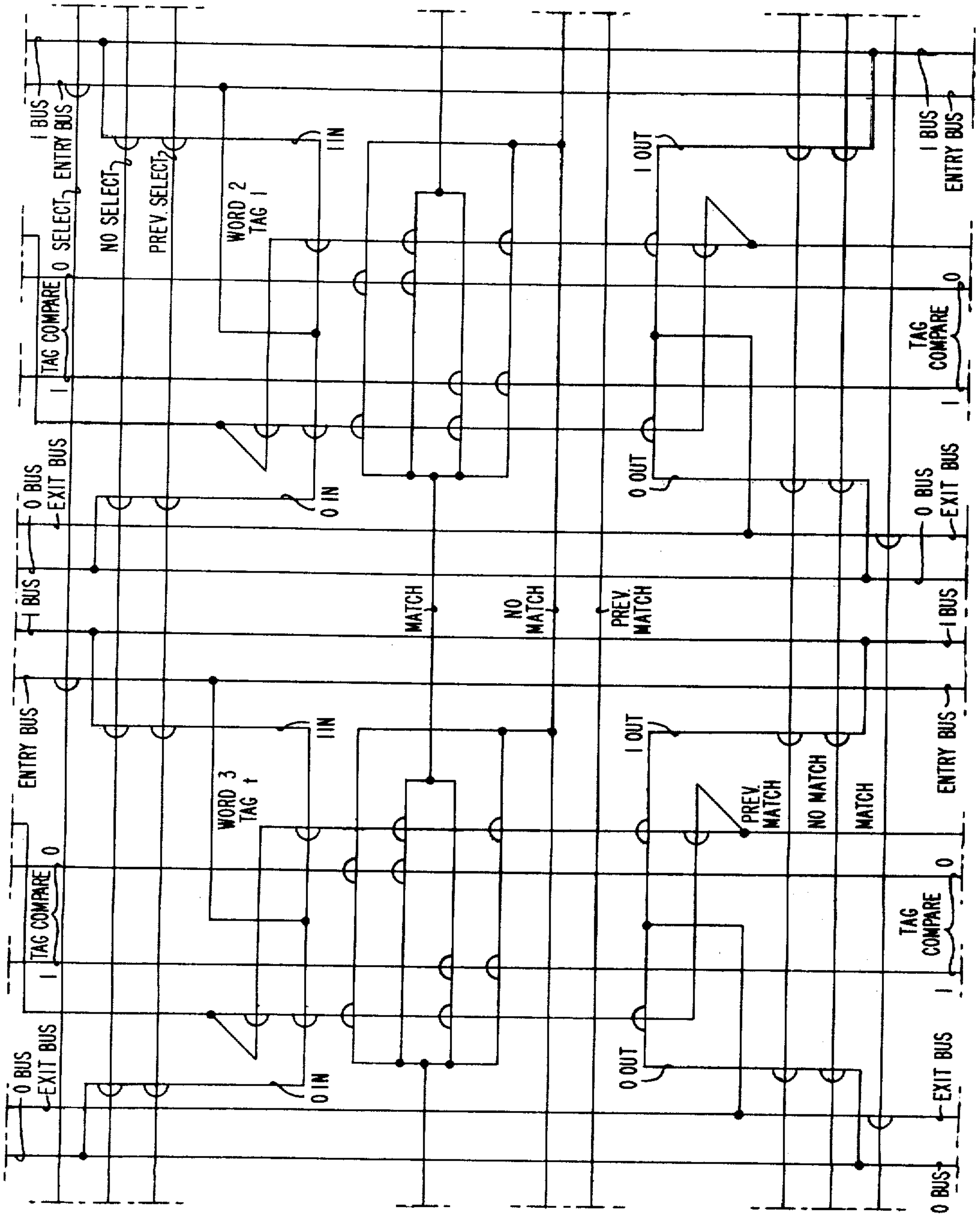
Figure 41:
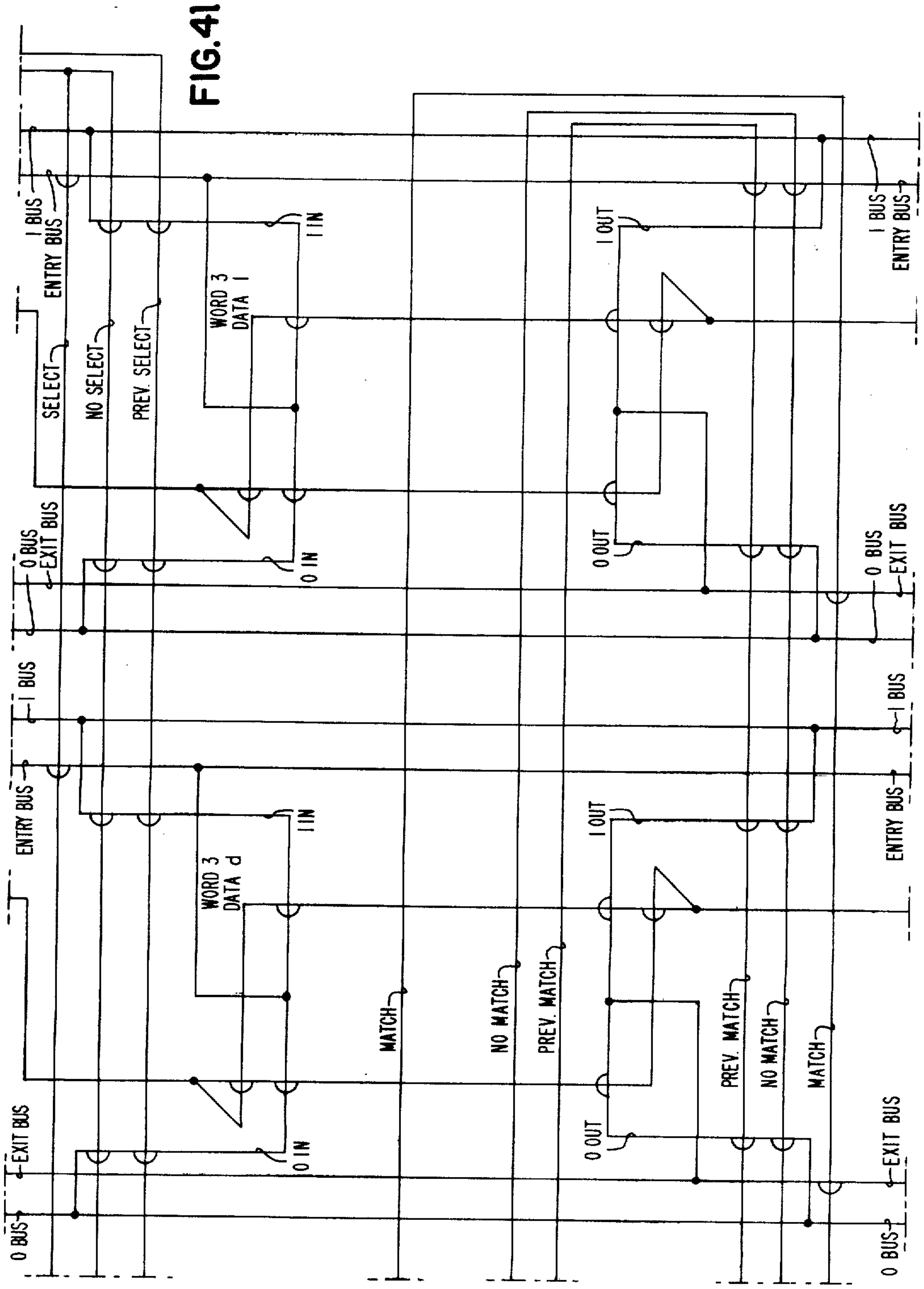
Figure 4M:
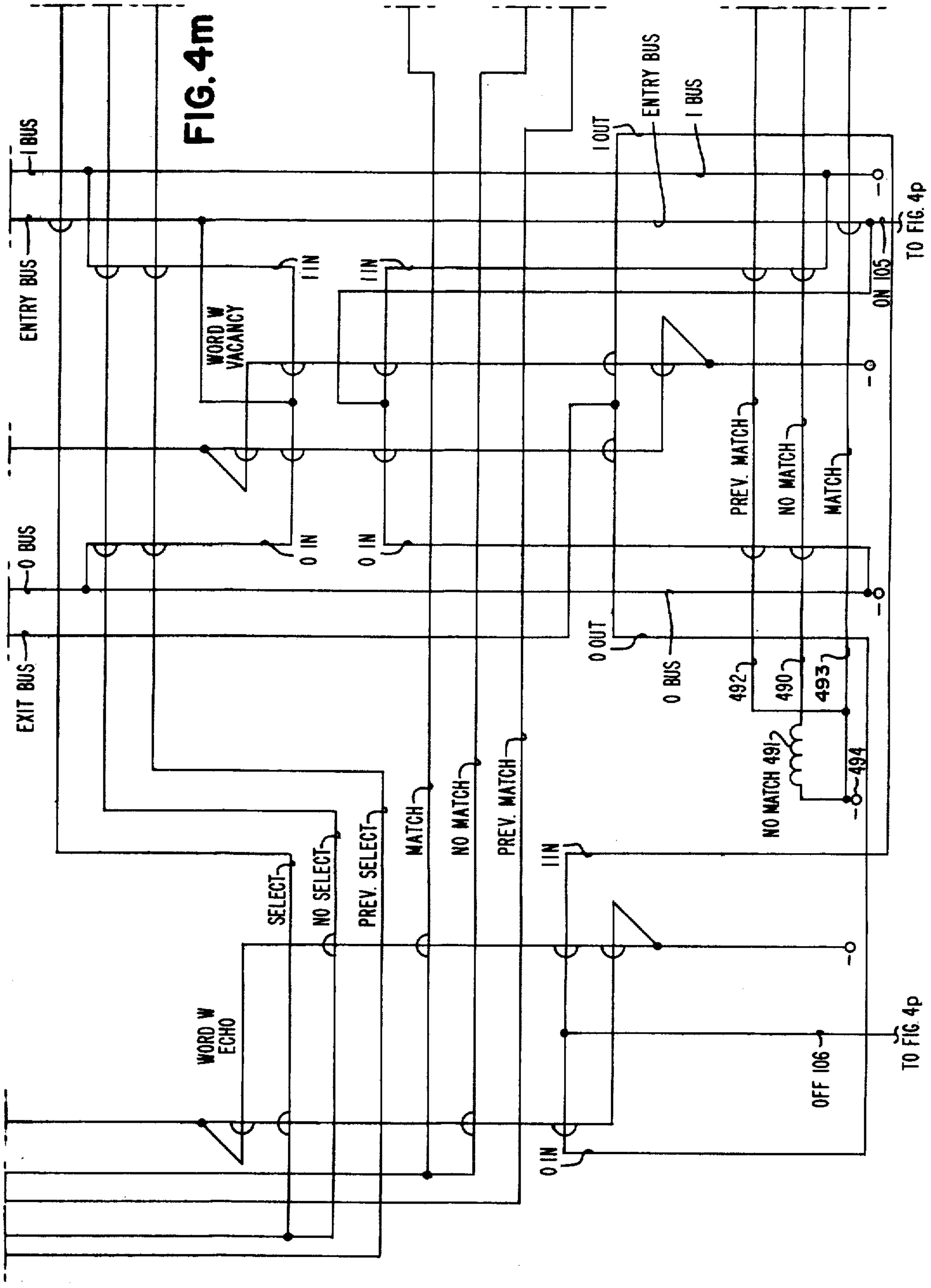
Figure 4N:
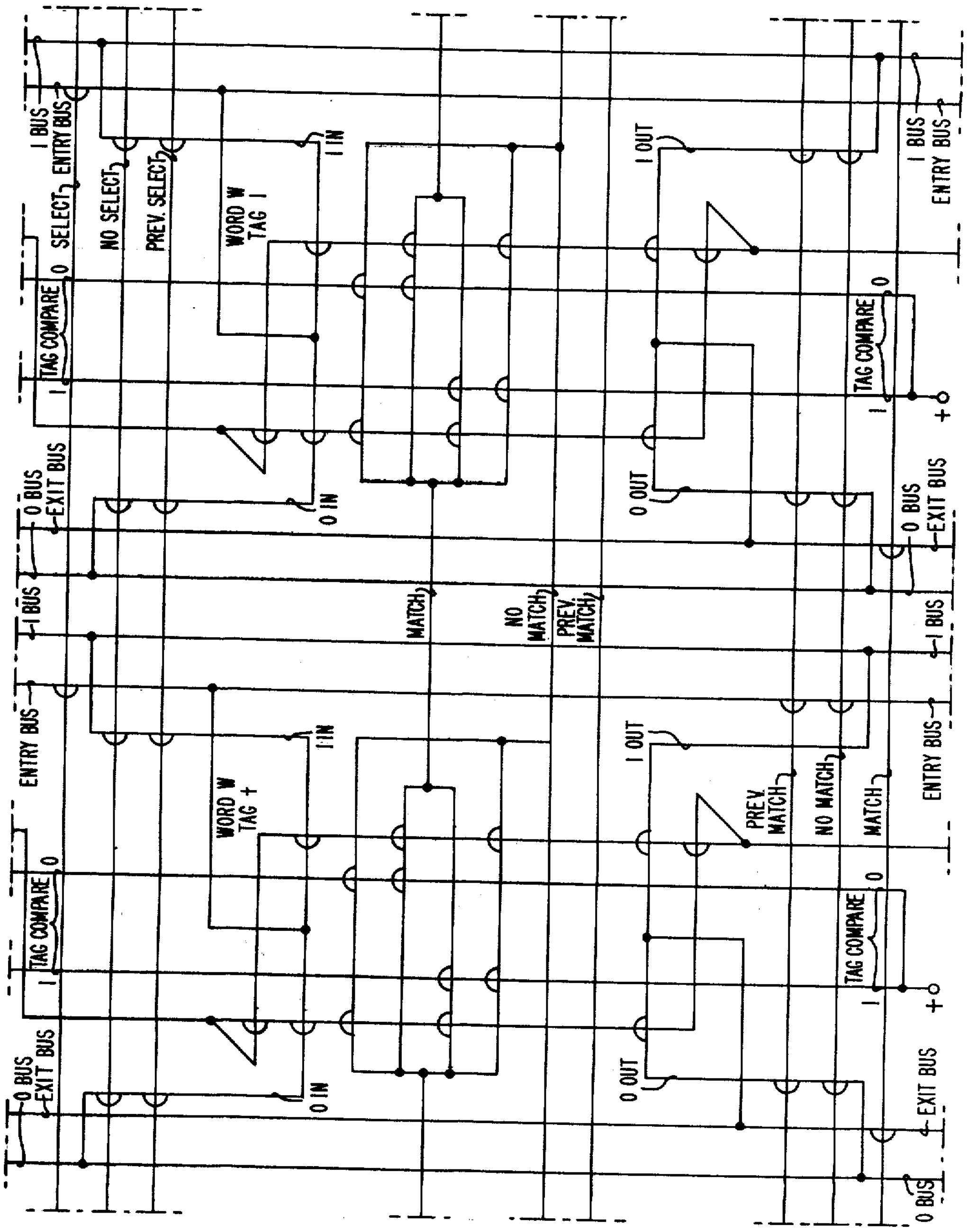
Figure 4O:
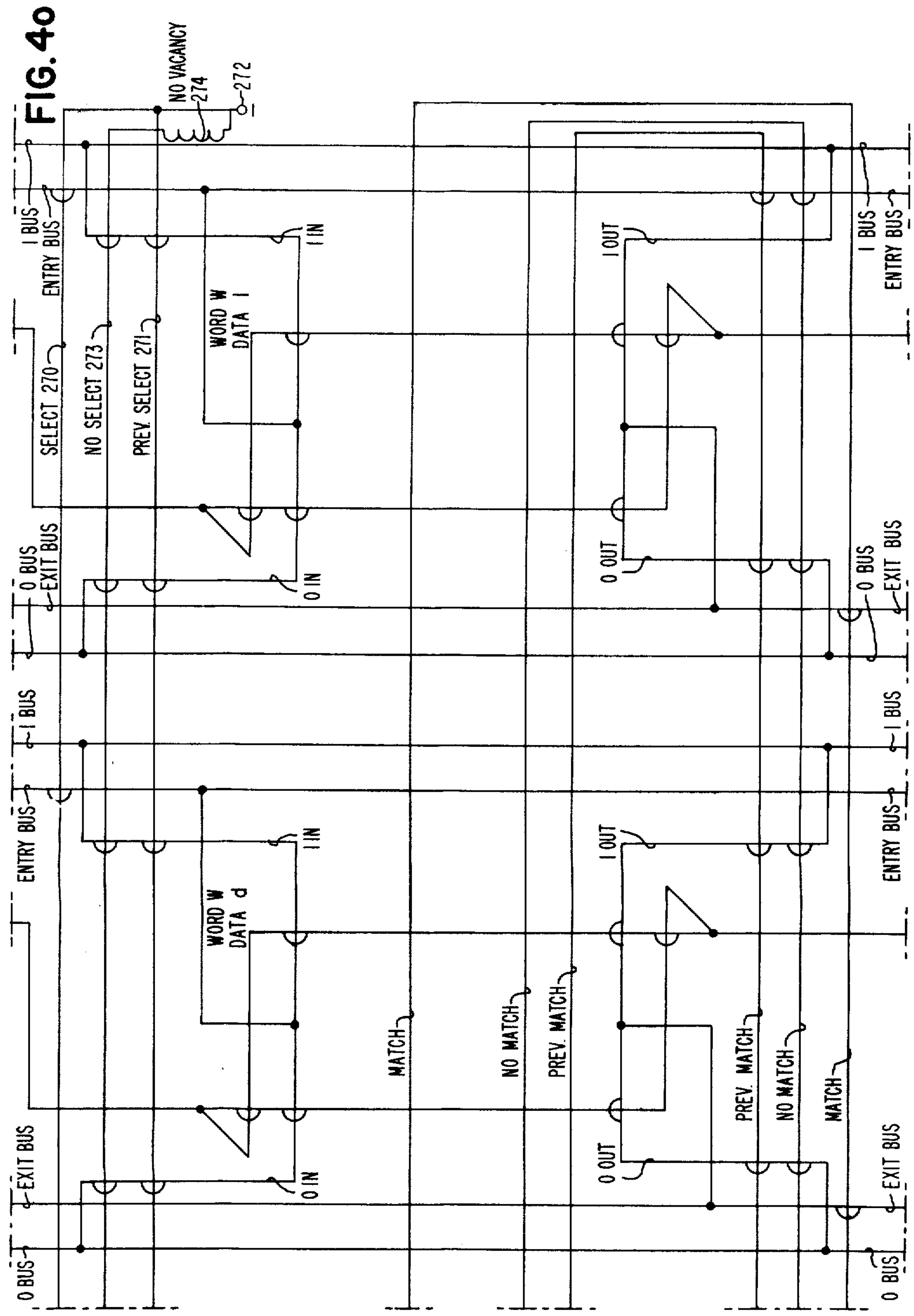
Figure 4P:
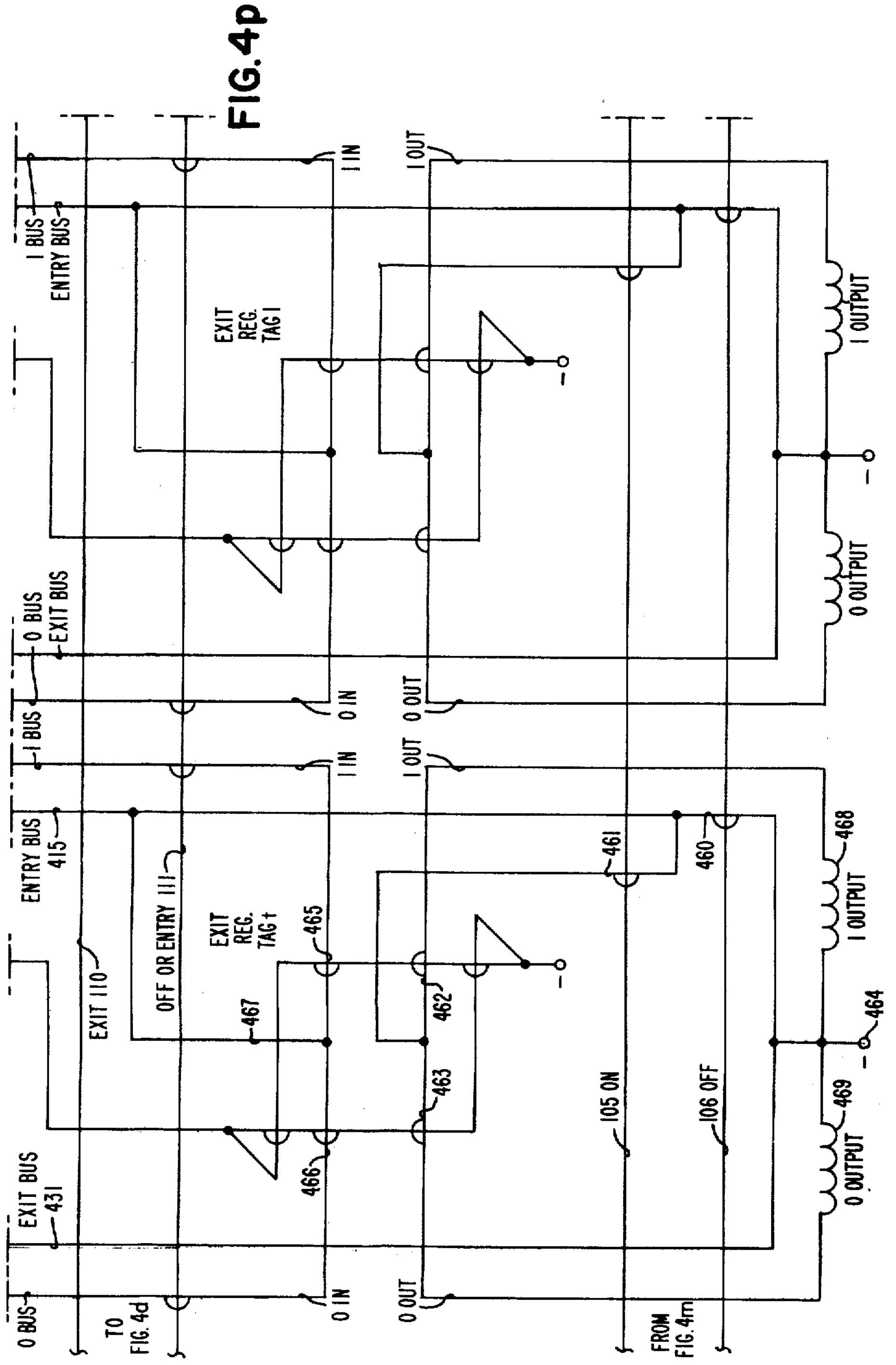
Figure 4Q:
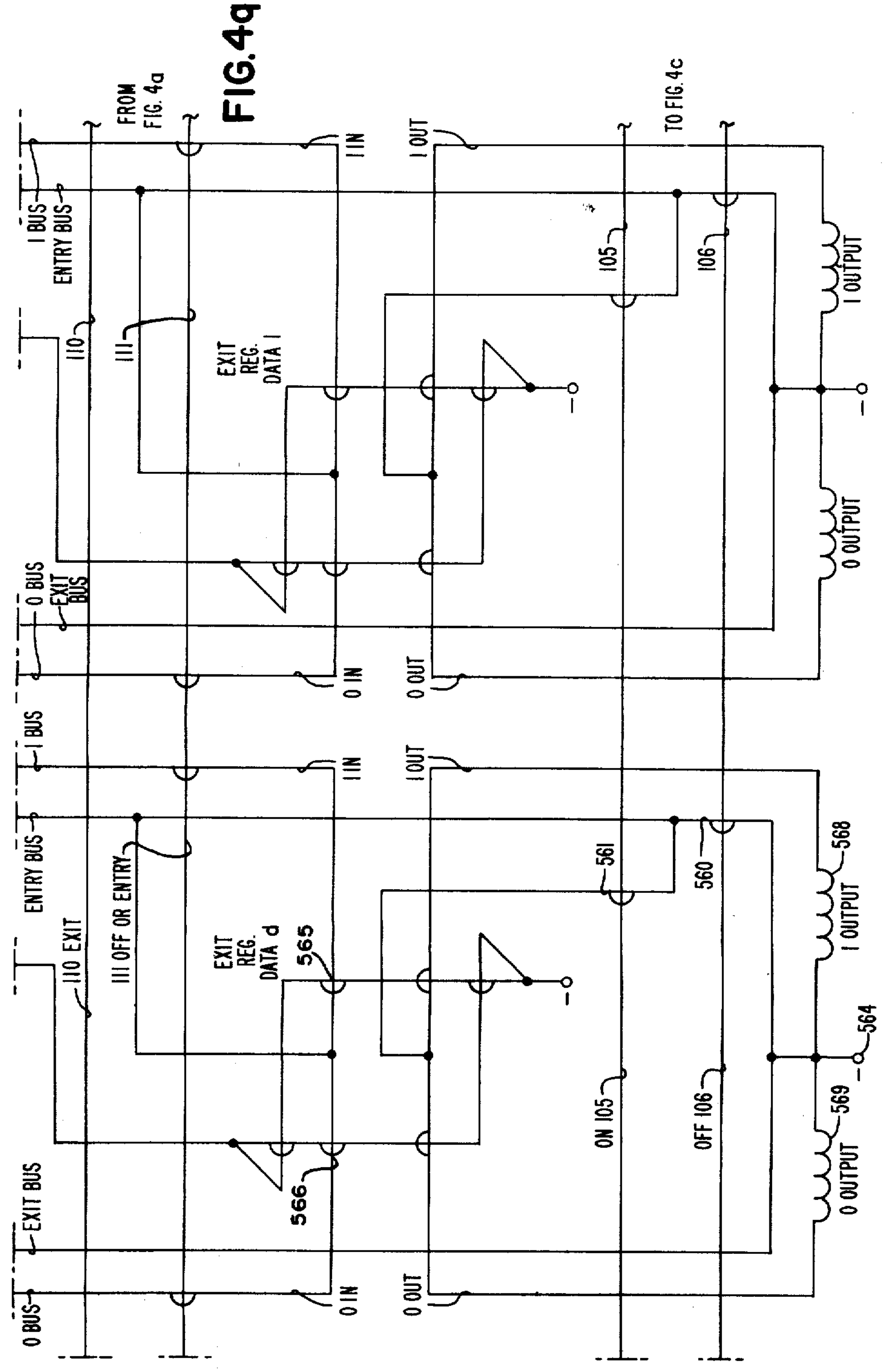

FIG. 3 is a diagram illustrating how FIGS. 4*a* through 4*q* are to be connected in order to form a composite circuit diagram of one embodiment of the invention, showing the location of the various parts of the exemplary memory system.

FIGS. 4*a* through 4*q* are detailed schematic diagrams, which together show a complete embodiment of our invention.

CONTENTS

| | Col. |
|---|---|
| BRIEF DESCRIPTION OF SYSTEM | 4 |
| INTRODUCTION TO DETAILED DESCRIPTION | 9 |
| Basic Cryogenic Circuit | 9 |
| Cryogenic Flip-Flop or Trigger | 10 |
| Notes Concerning System Details | 11 |
| CONTROL CIRCUIT DETAILS | 12 |
| TIMING Circuit | 12 |
| ENTRY-EXIT Register | 12 |
| VACANCY ENTRY Register | 13 |
| VACANCY Register | 15 |
| ECHO Register | 16 |
| TAG CIRCUITS | 18 |
| Entry and Exit of Tag Information | 18 |
| Transfer Into a Tag Register | 19 |
| Tag Comparison and Transfer From a Tag Register | 20 |
| DATA REGISTER CIRCUITS | 22 |
| Entry and Exit of Data | 22 |
| Transfer Into a Data Register | 23 |
| Transfer From a Data Register | 24 |

BRIEF DESCRIPTION OF SYSTEM

In FIG. 1 is shown a block diagram of a preferred embodiment of an associative memory system which operates in accordance with the present invention. This associative memory is contemplated for use with a computer or other data processing equipment, the computer or other equipment periodically supplying information to be stored in the associative memory, and similarly calling for retrieval of particular information as needed. It is assumed that the computer system contains the usual equipment, such as accumulators, input-output and instruction control means.

The associative memory system as disclosed must receive certain instructions and information from the computer. The computer supplies ON and OFF signals to control the transfer of information between various parts of the memory. In this description, an ENTRY operation is defined as one in which the computer or other equipment is supplying information to be stored in the memory; an EXIT operation is defined as being one in which information is retrieved from the memory under the command of the computer or other equipment. The computer will supply an ENTRY or EXIT signal in dependence upon whether information is to be stored in or retrieved from the memory, respectively. When a word is retrieved from the memory, the computer will enter a VACANCY bit into the corresponding word register to indicate that the register is still occupied, which is equivalent to a retention of the data in the word register, or if the word in the word register is not required for future reference, the computer will cause the register to be indicated as vacant. The computer will, of course, supply data information to be stored, as well as the tag information (in lieu of an "address") to identify the word being stored in an ENTRY operation; similarly, the computer will specify which information it wants to retrieve by indicating the tag portion of the word to be retrieved during an EXIT operation.

Information received from the computer for storage in selected VACANCY, TAG and DATA register positions are temporarily stored in corresponding ENTRY register positions, there being one for each tag and data bit position and one for the vacancy bit position, a single ENTRY register position per bit sufficing for all the word registers in the asociative memory. Similarly, when information is to be retrieved from the associative memory, it is temporarily stored in EXIT register positions; there is one EXIT register position for each data bit and one EXIT register for each tag bit position, each of which accommodates like bit positions for all of the word registers in the memory.

For each word register, an ECHO register is provided in addition to the VACANCY register to "echo" the status of the VACANCY register associated therewith. In the selection of a word register, the vacancy bit stored in the VACANCY ENTRY register is transferred to the VACANCY register of the selected word register. However, during an ENTRY or EXIT operation, the word registers are selected in part on the basis of their status as vacant or occupied. Therefore, the ECHO register is provided to indicate the original status of the word register, and the VACANCY register is provided to receive information indicative of the new status of the word register. Some time after the correct word register is selected, the vacancy bit is transferred from the VACANCY register to the ECHO register.

In FIG. 1, thirty-five blocks are shown arranged in seven vertical columns and six horizontal rows. The four columns to the right of FIG. 1 comprise register positions wherein the actual information bits, both tag and data, are stored. The four blocks in the top row comprise entry register positions common to all of the word registers in the corresponding column, and the four blocks in the bottom row similarly comprise exit register positions common to all of the word registers in the same column. Each horizontal row except the top and bottom rows comprise a "word register" wherein one unit of information, or word, may be stored. The three vertical columns of blocks to the left in FIG. 1 comprise control circuits, the three blocks in the top row being common to the entire memory, and each pair of blocks in the subsequent rows providing vacancy control for the word register represented by that row of blocks. For simplicity, the memory is shown as comprising four word registers each including two data bits (DATA 1 and DATA *d*) and two tag bits (TAG 1 and TAG *t*). Each register is controlled by corresponding vacancy circuits, there being a VACANCY register (second from left) and a vacancy ECHO register (left-most) for each word register. The first three word registers from the top are called WORD 1, WORD 2 and WORD 3 and correspond to the first three word registers in the memory system, and the bottom word register, WORD *w*, corresponds to the last word register in the memory system. Similarly, the TAG 1 position (fourth block from the right) in each word corresponds to the first tag bit position in the register and the TAG *t* position (third from right) corresponds to the last tag bit position in the register. The same is true for the DATA 1 and DATA *d* positions (second from right and right-most). Although no breaks are shown between WORD 3 and WORD *w*, or between the tag or data positions it should be understood that an associative memory is useful only if it has a large capacity, and therefore that any number of word register positions may be used.

The four word registers of the memory shown in FIG. 1 are so interconnected that the WORD 1 register takes precedence over all subsequent registers: the WORD 2 register is subsequent in response to WORD 1, but will respond in preference to WORD 3 through WORD *w*, and so forth. Reference to the arrows adjacent the interconnecting lines in FIG. 1 gives an indication of the direction in which the controlling currents thread their way through the memory apparatus.

The representation of each bit of a word stored in the memory may be represented in binary form, or by groupings of binary elements to encode characters and numbers in any of the usual ways. For instance, a word comprising a series of *t* tag bits and *d* data bits will comprise a whole string of binary ones and zeros, which may represent their true binary values, or a string of binary bits may be of grouped significance, such as groups of four bits, each group representing a decimal number from one to nine. Any other significance could be attached to the bits of information represented by the binary status of the registers. Similarly, a binary bit "1" is used to identify a selected register as being "occupied" (that is, as containing currently useful information) and alternatively, the binary bit "0" is used if the selected register is to be identified as "vacant." If more than one computer or other subsystem is associated with the memory, sufficient tag (or even data) bits may be provided to designate the particular subsystem from or to which the data word is to be moved.

In order to understand briefly how the memory operates, take first the operation of the TIMING circuit 101 (FIG. 1). When the computer has set the TIMING circuit 101 to the OFF position, the memory will receive a word from the computer into its ENTRY register and also will have a previously selected word in its EXIT register ready to send to the computer, as described more fully hereinafter. When the timing circuit is set to its ON state, the memory will transfer information from its ENTRY register into the first vacant word register (in an ENTRY operation), or will transfer information from the first word register with the correct tag into the exit register (in an EXIT operation). The output lines of the timing circuit are arranged in three pairs, each pair having an ON line 102 and a OFF line 103; at all times, either the ON lines 102 or the OFF lines 103 are operative (that is, have current flowing therein, as described more fully hereinafter), but the ON lines 102 and the OFF lines 103 are never both operative concurrently. An ENTRY-EXIT register 104 responds to computer instructions to transfer data to or from the word registers during an ON period. There are three pairs of output lines from the ENTRY-EXIT register, one pair 105, 106 being a continuation of the ON-OFF pair 102, 103 from the TIMING circuit 101, and the other two pairs each having one line 107 which is operative during an ENTRY operation and one line 108 which is operative during an EXIT operation. Just as in the case of the timing circuit output lines, one or the other of each pair 107, 108, but never both, are made operative at all times. The timing circuit 101 and ENTRY-EXIT register 104 operate in combination to provide the ON line 105, the OFF line 106, an ENTRY line 109, an EXIT line 110, an OFF OR ENTRY line 111 and an OFF OR EXIT line 112. These are the lines that control the operation of the memory. The OFF line 106 and ON line 105 control the transfer of vacancy bits between the VACANCY ENTRY, VACANCY, and ECHO registers throughout the memory.

The OFF OR EXIT and ENTRY lines 112, 109 together control the selection of word registers on the basis of the vacancy bit. As can be seen in FIG. 1, the OFF OR EXIT and ENTRY lines 112, 109 trace to the right through each of the ENTRY registers, and then go downward and trace to the left through each bit position of the WORD 1 register (as shown by the arrow). It will be noticed that before beginning to thread to the left through the WORD 1 register, the ENTRY line 109 is split into two lines, which together with the OFF or EXIT line 112, become the three lines 113 shown in FIG. 1*a* to be (from top to bottom) the SELECT, NO SELECT and PREVIOUS SELECT lines. After leaving the WORD 1 ECHO register (at the left in FIG. 1), the SELECT line combines with the PREVIOUS SELECT line and they in combination, together with the NO SELECT line, go downward and enter the WORD 2 ECHO register. Before entering the WORD 2 ECHO register, however, the NO SELECT line is split into two lines (just as does the ENTRY line) and it becomes the SELECT and the NO SELECT line before entering the WORD 2 ECHO register. The combining of the SELECT AND PREVIOUS SELECT lines upon leaving a word register, and the splitting of the NO SELECT line into a new pair of SELECT and NO SELECT lines, repeats itself as these lines wind their way from top to bottom, leftward and rightward, through each subsequent word register, down to and including the WORD *w* register. In each word register, the SELECT line that passes therethrough operates to set up that register for the entry of data therein, including the receipt of a new vacancy bit. In order to prevent any subsequent word registers from also being selected, the SELECT line for the WORD 1 register is made to become the PREVIOUS SELECT line for all subsequent word registers. The PREVIOUS SELECT line operates to prevent a word register from being selected during an entry operation, one line being operative to disable all of the word registers subsequent to the one at which the PREVIOUS SELECT line became operative.

It will be noticed that, since the OFF OR EXIT line 112 becomes the PREVIOUS SELECT line prior to entering the WORD 1 register, no ENTRY functions can be performed during a period when the TIMING circuit 101 has been set to OFF, or when the ENTRY-EXIT register 104 is conditioned to effect an EXIT operation. On the other hand, the ENTRY line 109 becomes the SELECT and NO SELECT lines before entering the WORD 1 register, and if the bit stored in the WORD 1 ECHO register is a "0" (indicating that the register is vacant), the select line will have current flowing therein and an ENTRY operation will be performed, entering data into WORD 1. If the ECHO register has a "1" stored therein, meaning that the WORD 1 register is not vacant, then the NO SELECT line will be the line through which current can flow, and no ENTRY functions will be performed in the WORD 1 register (just as if it had been the OFF OR EXIT line which was energized). Thus, we have two lines going through each word register for preventing an entry operation, and one line (the SELECT line) going through each word register which is effective to select that register for an entry operation. Both the NO SELECT and PREVIOUS SELECT lines are needed because these lines respond to different controls; the NO SELECT line is operative when the corresponding word register is itself incapable of receiving information as indicated by the ECHO register having a "1" stored therein; the PREVIOUS SELECT line prohibits the related word register and all subsequent registers from being selected, either because an entry operation is not being performed, or because some prior register has, in fact, been selected. It is the use of this combination of SELECT, NO SELECT and PREVIOUS SELECT lines which provides sequential selection of word registers in turn, as determined by their sequential position in the memory system, for an entry operation. Thus, any words to be stored in the memory are stored in the first vacant register.

The EXIT line 110 and OFF OR ENTRY line 111 operate in a manner similar to the OFF OR EXIT and ENTRY lines 112, 109 described above. It can be seen in FIG. 1 that the EXIT line 110 and the OFF OR ENTRY line 111 go downwardly at the left and across the bottom of FIG. 1, upwardly and into the DATA 1 EXIT register. These lines then go across to the left, through each of the EXIT registers. The EXIT line 110 actually performs no function in the EXIT registers (this is because of the negative logic required in the use of single crossing thin film cryotrons, as described hereinbefore), and the OFF OR ENTRY line 111 operates to block any data from being read into the EXIT registers during an ENTRY operation or when the TIMING circuit 101 is turned OFF. This function is similar to the function performed on the ENTRY register by the OFF OR EXIT line 112 and the ENTRY line 109 described above. After leaving the TAG *t* EXIT register, the EXIT and OFF OR ENTRY lines 110, 111 go to the left and then upward in FIG. 1, and enter the WORD 1 ECHO register. Before entrance into the ECHO register, the EXIT line 110 splits off into two lines, a MATCH line and a NO MATCH line, which together with the OFF OR ENTRY line 111 form a set of three lines 114 which comprises (from the top) a MATCH line, a NO MATCH line, and a PREVIOUS MATCH line, as illustrated in FIG. 1*a*. One of the set of three match lines 114 becomes operative, by circuits connected therewith, as they thread from left to right in FIG. 1. The lines then go downward and thread back as a corresponding set of three lines 115 which comprises (from the top in FIG. 1*a*) a PREVIOUS MATCH line, a NO MATCH line, and a MATCH line. The MATCH and NO MATCH line operate in a manner similar to the SELECT and NO SELECT lines described above, in that either of these can become operative in respective dependence upon whether or not the tag of the WORD 1 register matches the tag in the ENTRY register. If the tag bit stored in each of the WORD 1 tag bit positions matches the bit stored in the corresponding one of the ENTRY register tag bit position (that is, either is or is not a "1" or "0" respectively, as the case may be), then the MATCH line will be operative, and the information stored in both the TAG and DATA bit positions of the WORD 1 register will be transferred to the EXIT register for subsequent retrieval by the computer. On the other hand, if any one of the tag bit positions in the WORD 1 register do not match with the information stored in the corresponding ENTRY register tag bit position, then the NO MATCH line will be operative, and this will prevent any information from being transferred out of the WORD 1 register into the EXIT register.

Since read out of the tag and data positions is not destructive to the information stored therein (information being destroyed only upon the subsequent storage of different information in any given register), data may be erroneously recognized if there were no way to indicate that it is not to be recognized. In addition to the tag comparison control over which of these lines will be energized, the MATCH line can be operative only if the ECHO register indicates that the WORD 1 register is occupied, and the NO MATCH line can be made operative in dependence on the ECHO register indicating that the WORD 1 register is vacant, whether or not there is a match in the respective tag positions. Thus, only matching tags in word registers which are indicated as being occupied are recognized.

The vacancy control over the MATCH and NO MATCH lines creates the sequential significance of the word registers during a retrieval or exit operation. For instance, if the WORD 1 register and WORD 2 register have information stored therein, the tag bits of which are identical, but the data bits differing by one or more bits, then these words could be read out sequentially, as the following illustration shows. The EXIT line 110 being energized and WORD 1 register being occupied and having tags matching those in the ENTRY register, will cause current to flow in the MATCH line and in turn cause data to be transferred from the WORD 1 register into the EXIT register. At a previous time, when the ENTRY-EXIT register was conditioned for an EXIT operation, with the TIMING circuit turned OFF, a vacancy bit would have been placed into the VACANCY ENTRY register. This vacancy bit would be "0" in order to signify that the WORD 1 register is to be considered vacant after the EXIT operation. When the TIMING circuit is turned ON, the data in the WORD 1 register is transferred to the EXIT register, and the vacancy bit "0" is transferred to the WORD 1 VACANCY register, indicating this register as vacant. Upon a subsequent exit operation, the NO MATCH line will be operative in the WORD 1 register (as a result of the ECHO register indicating vacancy), rather than the MATCH line, preventing retrieval of the WORD 1 data at this time. The NO MATCH line leaving the WORD 1 register operates the WORD 2 register in the same manner that the exit line 110 operates the WORD 1 register. Specifically, it splits into a MATCH and NO MATCH line before entering the WORD 2 ECHO register; either line may be energized depending upon whether the register is both occupied and contains the proper tags, or not. Since in the example being given the WORD 2 register is occupied and does have the proper tags, information will be transferred from the WORD 2 register into the EXIT register in response to current flowing through the MATCH line in the WORD 2 register.

The vertical lines interconnecting the blocks in FIG. 1 provide for the actual transfer of data from the ENTRY register into a word register or from a word register to the EXIT register, and also apply timing control to the respective columns of blocks. But the detailed operation thereof is not essential to an understanding of the operation of the invention; it suffices here to know that these lines are controlled by the select lines 113 or the match lines 115. A more detailed description of the control and information circuits and signals is found hereinbelow, along with a detailed description of the associative memory circuits concerned therewith.

INTRODUCTION TO DETAILED DESCRIPTION

*Basic cryogenic circuit*

In the preferred embodiment of our invention, thin-film, single cross-over cryogenic switches are used because such elements provide high density and low cost apparatus. Briefly, the switch comprises a gate film, an insulating layer and a control film all disposed on a supporting substrate. The gate film is the switched element and is either superconductive or resistive depending upon the magnitude of the current in the control film, which is the switching element. If the current in the control film exceeds a critical value, the gate is resistive. For a value of control current less than the critical value, the gate is superconductive. Appropriate interconnecting films connect the cryotrons in logical configurations. The control film and interconnecting films are superconductive throughout the operation of the apparatus and therefore offer no resistance to current supplied thereto. In FIG. 2*a* there is shown a symbol for a thin-film single cross-over cryotron 40. The gate conductor 42 is identified by a straight line having the diameter of a semicircle superimposed thereon. The control conductor 44 is identified by a straight line at right angles to the gate conductor and bisecting the diameter of the semicircle. The symbol does not indicate the direction of current flow through a conductor since the actual polarity is irrelevant to the cryotron per se, the cryotron being sensitive only to the magnitude of control currents which are usually either substantially zero or somewhat more than the critical current value. It is assumed that all cryotrons illustrated herein operate with essentially identical critical current magnitudes, and that each current source need only supply that same magnitude of current. FIG. 2*a* shows a current source 46, which may provide gate current I*g*, and a pair of single-crossing cryotrons having their gate conductors 42 and 48 connected in parallel and their control conductors 44 and 50 connected so that control current I*c* may be supplied to each by way of terminals 52, 54 and 56. Assume that the right-hand gate 48 is superconductive and that the left-hand gate 42 is resistive because of I*c* flowing from terminal 52 to terminal 56, so that gate current I*g* flows through the right-hand gate conductor 48. With this condition established, control current may be removed from the left-hand control conductor 44, and although its gate conductor 42 becomes superconductive, the current I*g* will not divide between the parallel gate conductors but is maintained in the right-hand path including gate 48. Further, if control current is supplied to both control conductors 44 and 50, both gate conductors 42 and 48 become resistive and current I*g* divides between the two paths so that neither one nor the other current is above the critical value. Additionally, if one gate is superconducting and the other is superconductive and then the current I*g* is removed, a circulating or persistent current flows in the parallel circuit composed of the gate conductors 42 and 48, but no current flows in either the input line 46 or the output line 58. Because the output current from such a parallel circuit derived from line 58 is used to perform some operation in circuits fed thereby, one superconductive path for the input current I*g* is always maintained for each current source. Consider now that the right-hand gate conductor 48 is superconducting and control current is removed from the left-hand cryotron 40. The total current I*g* continues to flow in the right-hand gate 48 in the absence of control current supplied to the right-hand control conductor 50. Therefore, to switch the current from the right-hand gate 48 to the left-hand gate 42, it is not sufficient to remove the current from the left-hand control conductor 44, but in addition, control current must be supplied to the right-hand control conductor 50 to thereby render its gate 48 resistive and direct I*g* into the other path to gate 42. From the foregoing it should be apparent that the gate current source must have a superconductive path provided and that complementary control must be maintained over associated gate circuits throughout the operation of the apparatus: whenever one path is blocked, another path must be rendered superconductive to provide a route for the current to flow. It should also be apparent that every stage which is to be rendered nonconductive must have control current supplied thereto. The manner in which these last two requirements are fulfilled in the preferred embodiment of our invention is described in conjunction with the detailed description of the various circuits hereinafter.

*Cryogenic flip-flop or trigger*

Referring now to FIG. 2*b*, there is shown a basic flip-flop (or trigger) with read-in and readout control circuits. Cryotrons 60 and 62 are the flip-flop pair. A current source 64 has two parallel paths 66 and 68, only one of which is superconductive at a time. If the left path 66 is superconducting, the flip-flop is said to be in the ON status or is said to contain a "1"; if the right path 68 is superconducting, the flip-flop is said to be in the OFF status or to contain a "0". Bistable operation is accomplished by feedback of gate current to control conductors. For example, if the flip-flop contains a "1", the left path 66 including a left flip-flop gate conductor 69 is superconducting and the gate current flowing through a control conductor 70 renders a gate conductor 72 associated therewith resistive, thereby maintaining current in the left path 66. Similarly, the other state of the flip-flop is maintained when the right path is superconducting.

The flip-flop of FIG. 2*b* has a pair of read-in cryotrons 74, 76 each having a gate conductor 78, 80 in series with one of the flip-flop paths 66, 68 respectively. A control conductor 82, 84 of each read-in cryotron may each be fed with current individually by suitable termination at a corresponding terminal 86, 88 so that the current from the source 90 is directed into one or the other of the control conductors. By causing I*c* to flow in the control conductor 82 of the left-hand read-in cryotron 74, a "0" is entered into the flip-flop in a manner to be described hereinafter. Energization of the control conductor 84 of the right-hand read-in cryotron 76 causes a "1" to be entered into the flip-flop.

Beneath the read-in cryotrons are a pair of read-out cryotrons 92, 94 each having its control conductor in series with one of the flip-flop paths. The right-hand cryotron 94 of the read-out pair is used to detect a "1" and the left-hand cryotron 92 is used to detect a "0". Since these are the read-out cryotrons, it is their gate conductors 98, 100 which are sampled as to resistive or conductive states by the steering of current from a source 96 into one or the other read-out gate conductor to a suitable EXIT termination.

Assume that the flip-flop of FIG. 2*b* is in the "0" state (right path 68 superconducting) and it is desired to read-in a "1". Control current is caused to flow through the control conductor 84 of the "1" entry cryotron 76 making its gate conductor 80 resistive. Since both the right and left paths of the flip-flop are now resistive, the current from the source 64 divides in half between the two paths of the flip-flop. When the current through each path falls near the half point (or below the critical value), neither the upper flip-flop gate 69 nor lower flip-flop gate 72 is resistive thereby leaving the "1" entry cryotron gate 80 as the only resistive gate. This action forces all of the current from the source 64 into the left-hand path 66 of the flip-flop which makes the lower flip-flop gate 72 resistive via current in its control conductor 70. The flip-flop is now in its stable state of "1" or ON and the "1" entry current can be removed from control conductor 84 without change of state of the flip-flop. In like fashion, the flip-flop can be set to "0" or OFF by application of control current to the "0" entry control conductor 82. Detecting the state of the flip-flop is accomplished by coupling a circuit from the read-out current source 96 through one of the read-out cryotrons 92 or 94. Therefore, the read-out operation is nondestructive. Assuming the flip-flop to be in the "0" state, the gate 98 of the right-hand read-out cryotron 94 is resistive and current is directed through the "0" exit gate 100 (non superconductive) to the output device where the presence of a current indicates that a "0" has been sensed. Similarly, with the flip-flop in the "1" state, the current is directed through a "1" exit gate 98.

*Notes concerning system details*

In the illustrations of the preferred embodiments of this invention, "+" and "—" signs have been used to designate the connections to a current source, but the actual polarity of the connections are irrelevant and may be interchanged, as mentioned hereinbefore. Although many separate pairs of "+" and "—" signs are shown, these separate circuits may be connected in series to a single common current source. To retain constant input current during switching operations where slightly different characteristics of cryotrons would cause transient conditions, an inductance may be connected between the outputs and inputs of devices which are connected in series, such as those devices shown in FIGS. 2*a* and 2*b*. It is assumed that when power is first supplied to the system, all of the flip-flops are set to the "0" or OFF state by circuits (not shown) which operate the "0" entry cryotron 74.

FIGS. 4*a*–4*q* show the circuit details of the memory system of FIG. 1. By referring to FIG. 3, FIGS. 4*a*–4*q* can be arranged as a composite diagram, the various registers, controls, etc., being identified and their location and relationship determined by their respective positions in the various portions of FIG. 3. It is helpful to compare FIG. 1 and FIG. 3 at this time so that the general description presented hereinbefore can be applied to the composite diagrams of FIGS. 4*a*–4*q*. With reference to FIG. 1 and FIG. 3, it becomes apparent that in selecting the capacity of a memory apparatus by defining the number of word registers "*w*," an entire memory system is precisely described by repeatedly inserting two rows of circuits shown in FIGS. 4*g*, 4*h*, 4*i* and FIGS. 4*j*, 4*k*, 41, etc. Further, although only two data bit positions and two tag bit positions are shown for each of the word registers, and these respective bit positions are not separated by broken lines, nonetheless merely repeating a column of apparatus (for instance, the left-hand halves of FIGS. 4*b*, 4*e*, 4*h*, 4*k*, 4*n* and 4*p*, which comprise the column for the TAG *t* positions) one could provide as many tag bits as desired. Similarly, expansion of the data storage apparatus to provide as many data bit positions as desired would be possible by repeating the apparatus in either the right-hand or the left-hand halves of FIGS. 4*c*, 4*f*, 4*i*, 4*l*, 4*o* and 4*q*. Accordingly, the memory system disclosed herein, although shown comprised of four word registers each having two data bits and two tag bits, could be expanded to accommodate any number of words having any number of tag or data bit positions.

In the description hereinafter, it is unnecessary to describe the operation in terms of more than a single word register and single data bit and tag bit positions; the similarities between the circuits actually referred to and corresponding circuits in other bit positions should be readily apparent; therefore, reference will be limited to those circuits actually necessary in order to describe the preferred embodiment of the invention.

The detailed diagram shown in the composite of FIG. 4 is identical to FIG. 1 except that the control components and circuits within the boxes shown in FIG. 1 are shown in complete detail in FIG. 4. Therefore, frequent reference to FIG. 1 as well as FIG. 4 in the following detailed description will greatly simplify an understanding of the operation of the preferred embodiment about to be described. The complete description of the circuitry, and of the flow of current in the operation of the various cryogenic stages will not be made in the following detailed description since, because of the introductory description of the cryogenic circuit and flip-flop in FIGS. 2*a* and 2*b*, it is believed that a simple tracing of the controlling current and the current that result therefrom will be sufficient.

CONTROL CIRCUIT DETAILS

*TIMING circuit*

The TIMING circuit (shown at the left-hand end of FIG. 4*a*) comprises a flip-flop (or trigger), the status of which is determined by the computer, or other associated equipment. As stated hereinbefore, with the TIMING circuit in the OFF position, the memory will receive a word from a computer into the ENTRY register and will also have a previously selected word in the EXIT register ready to send to the computer. With the TIMING circuit ON, the memory will transfer information from the ENTRY register into the first vacant word register or from a selected word register into the EXIT register, the choice of these two functions being made by the ENTRY-EXIT register, as described hereinafter.

Starting at the top of the TIMING circuit, a current source 200 supplies current to an ON-OFF switch 201, which represents a device in the computer (or other associated equipment) that controls the operational timing of the memory system. This is shown as a manual switch to emphasize the fact that it is external from the memory, but in actual practice, the switch would more likely comprise the gate conductors of a pair of cryotrons, to which current is selectively applied by the computer in order to cause the current from the source 200 to pass through one or the other, depending on whether an ON or OFF indication is desired. From the ON side of the switch 201 (the right-hand side as shown), current will flow downward and through a control conductor 203 of a right read-in cryotron 204 to turn the timing flip-flop ON by making a right-hand path 205 resistive and a left-hand path 217 superconductive. Since the right-hand path 205 is resistive, and the left-hand path 217 is superconducting, each of a set of gate conductors 206, 207, 208 will be carrying current from corresponding current sources 209, 210 and 211. With the ON-OFF switch 201 placed to the OFF position (to the left), current will flow from the top source 200 through the control conductor 212 of a left read-in cryotron 213, causing the left path 217 to become resistive and the right path 205 to become superconductive. Current flow through the right path 205 then causes each of the set of gate conductors 206, 207, and 208 to become resistive so that current will now flow from each of the sources 209, 210 and 211 through the set of left cryotron gate conductors 214, 215 and 216. Thus, current will always flow from a source 209 into an ON line 105 or an OFF line 218, from a source 210 onto an ON line 219 or an OFF line 220, and from a source 211 onto an ON line 221 or an OFF line 222, depending on whether the timing switch is turned ON or OFF, respectively.

*ENTRY-EXIT register*

When the timing circuit is ON, the operation of the memory is under control of the ENTRY-EXIT register, as stated hereinbefore. In an ENTRY operation, which is indicated in the ENTRY-EXIT register by a binary bit "0," a word is transferred from the ENTRY register to a selected word register. Similarly, an EXIT operation causes a word to be transferred from a selected word register into the EXIT register. This operation is indicated by a binary bit "1" in the ENTRY-EXIT register. The timing ON-OFF conditions were defined above to include the fact that when the timing is OFF, the memory will receive a word from the computer into the ENTRY register. This is the same time at which the ENTRY-EXIT information is received from the computer. Therefore, the OFF line 218 supplies current to an ENTRY-EXIT switch 223 and down either the right or left side to a control conductor 224 of a right read-in cryotron or the control conductor 225 of the left read-in cryotron depending on whether the ENTRY-EXIT switch is set to EXIT (to the right) or ENTRY (to the left), respectively. The OFF current then continues upwardly through an extension 106 of the OFF line 218, which supplies current to the VACANCY ENTRY register and each of the VACANCY and ECHO registers for all of the word registers in the memory. Since each of a plurality of ENTRY-EXIT readout cryotron gate conductors 227, 228, 229 and 230 is supplied current by respective ON lines 219 and 221, there is no current through them at this time. Thus, it can be remembered that any ENTRY or EXIT line can be considered to be an ON AND ENTRY or ON AND EXIT line, since they are operative only when the TIMING circuit is on.

Assuming the ENTRY-EXIT input switch 223 is set to EXIT as shown, when the timing circuit switches ON, current will flow from the ON line 219 through the gate conductor 227 of a right cryotron, onto an EXIT line 227*a*, where it is joined by the OFF line 220 to become the OFF OR EXIT line 112. Current will also flow from the ON line 221 through another right cryotron gate conductor 229 and onto an EXIT line 110. If, on the other hand, the EXIT ENTRY switch 223 is set to the ENTRY position, current will flow from the ON line 219 through a left cryotron gate conductor 228 and onto an ENTRY line 109. Current also flows from the ON line 221 through the other left cryotron gate conductor 230, where it combines with the OFF line 222 to become an OFF OR ENTRY line 111. The TIMING circuit and ENTRY-EXIT register, therefore, provide the following lines (from the top in FIG. 4*a*), which were introduced in the description of FIG. 1, hereinbefore: an OFF line 106 and an ON line 105 which go to the VACANCY ENTRY register; an ENTRY line 109 and an OFF OR EXIT line 112 which go to the ENTRY register for the highest tag bit position (TAG *t*) and then control the select circuits 113 in all of the word registers in the memory; and an OFF OR ENTRY line 111 and an EXIT line 110, which leave FIG. 4*a* at broken terminations at the left-hand corner thereof, but as shown in FIG. 1, enter into the DATA 1 exit register position at the lower right-hand corner of FIG. 1, which position is shown in detail in FIG. 4*q*.

As described hereinbefore, each of the control conductors are themselves superconductive at all times as are the films on the substrate which act as interconnecting lines between the various cryotrons, therefore, current can flow through any number of control conductors without diminishing the magnitude thereof.

*VACANCY ENTRY register*

Another control over the memory is exercised by the vacancy bit which accompanies each word entering the memory and which is used to indicate the availability of the location in which the word is stored. A vacancy bit "1" designates an unavailable location (that is, an occupied register); a vacancy bit "0" designates a location which is available for receiving a word (that is, vacant). The vacancy bit of a word extracted from memory is dropped; that is, there is no exit register to receive the vacancy bit, it having no significance in the computer or other equipment. But since readout of a location in memory is nondestructive, the word may be repeatedly retrieved if desired by supplying a vacancy bit of "1" to indicate that the register storing the nondestructively extracted word is occupied, which is equivalent to a status of containing still useful information, or information to which future reference can be made. Thus, in an EXIT operation, a vacancy bit is supplied to the ENTRY register along with the tag information which identifies the particular word desired. If the vacancy bit supplied is a "1," the selected word is retrieved and its vacancy bit remains set to "1," to indicate that the word register is unavailable, or alternatively, to indicate to the memory that it must maintain the information in that word register. If the incoming vacancy bit is a "0," the word is retrieved and the word register which was formerly occupied by that word is made available. For example, a word in memory must have a vacancy of "1" so that it may be extracted during an EXIT operation, and it may be selected and retrieved as many times as desired as long as the vacancy bit portion of the instruction is a "1" each time that the word is retrieved. If the word is no longer required to be held in the memory, the retrieval instruction during the last retrieval operation will include a vacancy bit of "0" to make the word register location available. In the latter case, the information will still be contained in the tag and data bit registers after retrieval, but having the vacancy bit being set to "0" is equivalent to having an empty register; the data can not be retrieved thereafter, and new data may be stored therein. It will be noticed that, since these word registers all comprise flip-flop or trigger stages, which are set to either "1" or "0," there being no third or inoperative position to which they can be set, there is no way to actually "erase" data from the memory, other than by the vacancy bit.

More specifically, the incoming vacancy bit is initially placed in a VACANCY ENTRY register, which is shown at the right hand side of FIG. 4*a*. At the top of the VACANCY ENTRY register, the OFF line 106 supplies current to the VACANCY INPUT switch 235 through which current is transferred downward either through a control conductor 236 of a right cryotron, or through a control conductor 237 of a left cryotron, depending on whether the instruction given by the input switch is a "1," indicating occupancy, or a "0," indicating vacancy, respectively. After passing through one or the other of the control conductors 236, 237, the current continues on an extension of the OFF line 106 which acts as (and is so called) an EXIT BUS 246, to the left and downward, where it will cause (when current is flowing therein) readout of each vacancy register into the corresponding ECHO register, as described hereinafter. These cryotons will set the VACANCY-ENTRY flip-flop so that either a left path 238 or a right path 239 will be conductive respectively. After the TIMING circuit changes from OFF to ON, current may flow through the ON line 105 downward and through a gate conductor 242 of a left cryotron and then onto a "0" OUT line 243, or through a gate conductor 240 onto a "1" OUT line 241. However, if no register is selected, so that the vacancy bit will not be transferred to any VACANCY register, current will not flow through either of the gate conductors 240, 242 but will flow through an extension 244 of the ON line 105 which operates as (and is so called) an ENTRY BUS (within the column of vacancy circuits) as described hereinafter. Assuming that current does flow through one or the other of the gate conductors 240, 242 either the "1" line 241 or the "0" line 243 will conduct current downwardly through a "1" BUS or a "0" BUS (each of which is shown in FIGS. 4*d*, 4*q*, 4*j* and 4*m*), respectively.

*VACANCY register*

The detailed circuits of the WORD 1 VACANCY and ECHO registers, are shown in FIG. 4*d*. When arranged in composite, the lines leaving the bottom of FIG. 4*a* interconnect with the lines entering the top of FIG. 4*d*. With reference to the top of FIG. 4*d* it is seen that the four vertical lines entering the top of the figure are, from left to right, an extension of the EXIT BUS 246, a "0" BUS 243, an extension line 247 of the positive source that feeds the VACANCY ENTRY register flip-flop, the ENTRY BUS 244, and the "1" BUS 241. The "0" BUS 243 and "1" BUS 241 may have current in one or the other of them only during ON time, since it is the ON line 105 (FIG. 4*a*) which steers current to these buses in the VACANCY ENTRY register. The VACANCY register shown to the right of FIG. 4*d* comprises two sets of input control cryotrons, a "0" IN control conductor 248 operative to receive a zero from the VACANCY ENTRY register during an ENTRY operation, and a "0" IN control conductor 249 operative to receive a zero bit from the VACANCY ENTRY register during an EXIT operation. The VACANCY register also has a pair of "1" IN control conductors 250, 251 operative to receive one bits from the VACANCY ENTRY register during ENTRY and EXIT operations, respectively. Both of the "0" IN control conductors receive current from the "0" BUS 243, and both of the "1" IN control conductors 250, 251 receive current from the "1" BUS 241. Control over receiving current to signify zeros or ones in these control conductors is effected by a pair of gate conductors 252, 253 which are controlled by the NO SELECT line 254 and PREVIOUS SELECT line 255. The control conductors 249, 251 selectively receive current under the control of a pair of gate conductors 256, 257 which are in turn controlled by a PREVIOUS MATCH line 258 and a NO MATCH line 259. An alternative path for the ON line 105 (mentioned previously) is the vacancy ENTRY BUS line 244 which passes downward through each of the vacancy registers. The ability of current to flow through the ON line is conditioned by the SELECT line 260 and the MATCH line 261. Assuming that the ENTRY-EXIT register is ON, current can flow either through the "0" OUT control gate conductor 242 or the "1" OUT gate conductor 240 in the VACANCY ENTRY register, or can pass downward on the ENTRY BUS 244. If either the NO SELECT line 254 or PREVIOUS SELECT line 255 has current flowing therein, this indicates that this particular word register is not being selected in an entry operation; similarly, if current flows in either the PREVIOUS MATCH line 258 or the NO MATCH line 259 for the WORD 1 register, this indicates that this register has not been selected for retrieval of information during an exit operation. Therefore, current flowing in any of these lines blocks the vacancy bit stored in the VACANCY ENTRY register from being transferred into the WORD 1 VACANCY register. At the same time, if neither the NO SELECT line 254, PREVIOUS SELECT line 255, PREVIOUS MATCH line 258 or NO MATCH line 259 has current flowing therein, either the SELECT line 260 or the MATCH line 261 will have current flowing therein depending on whether it is an ENTRY or EXIT operation, respectively. In such case, the current will flow in either a control conductor 262 in series with the SELECT line, or through a control conductor 263 in series with the MATCH line, again depending upon whether it is an ENTRY or EXIT operation, respectively. This means that if there is no current flowing in either the NO SELECT line 254 or the PREVIOUS SELECT line 255, current will flow in the SELECT line 260 and block the flow of current through the ENTRY BUS 244 while permitting current to flow through either the "1" BUS 241 or the "0" BUS 243 into the WORD 1 VACANCY register. Inspection of FIGS. 4*d*, 4*q*, 4*j* and 4*m* together will show that the tendency to enter a "1" or a "0" on the "1" BUS or '0" BUS, and the tendency to have ON current in the ENTRY BUS 244, will persist downward to the register in which a selection was made, said register having SELECT or MATCH current flowing, thereby blocking ON current from flowing downward any further. Since SELECT current flows exclusively of NO SELECT or PREVIOUS SELECT current, and since MATCH current flows to the exclusion of PREVIOUS MATCH or NO MATCH current at this register (as will be described more fully hereinafter), PREVIOUS SELECT current will not be flowing because if there had been a previous register selected, the current would have flowed into that register in lieu of any other register.

Data transferred in an ENTRY operation will be passed from the "1" and "0" BUSES respectively by the lack of blocking current in the NO SELECT or PREVIOUS SELECT lines; in an EXIT operation, data will be transferred from the ENTRY register into the VACANCY register by the lack of blocking current in the NO MATCH and PREVIOUS MATCH lines. Therefore, it can be seen that there are separate input circuits to the VACANCY register, there being one each for the ENTRY and EXIT operations.

Returning now to the right center of FIG. 4*d*, after current flows through any of the IN control conductors 248, 249, 250, 251 it is transferred into a corresponding connection 264, 265 to the ENTRY BUS 244 so that current will either flow downwardly all the way to the bottom of FIG. 4*m* through each successive vacancy register in turn, or will flow downwardly through either the "1" BUS or "0" BUS until it passes through the "1" IN or "0" IN control conductors in a subsequent register, and it will then join with the ENTRY BUS 244 and travel downwardly the rest of the way on said line as before. Referring to FIG. 4*o*, the SELECT line 270 and PREVIOUS SELECT line 271 in the WORD *w* register both terminate in a negative source 272. But if none of the registers is vacant, the NO SELECT line 273 will carry current through each of the word registers, and will operate some device in the computer, which is here illustrated as a NO VACANCY indicator 274. Although shown as a coil (as for a magnetic device), the indicator 274 may be any other compatible means such as a control conductor of a cryotron through which current for computer monitoring equipment may flow.

*ECHO register*

Referring now to the right-hand side of FIG. 4*d*, the WORD 1 ECHO register is shown as consisting of a source 300 feeding a flip-flop pair of cryotrons 301, 302 which are set to conduct current through a right path 303 or a left path 304 by control conductors 305, 306 which are rendered resistive by current flowing in a "1" IN line 308 or a "0" IN line 307 respectively. The lines 308, 307 have currents flowing therein as a result of the EXIT BUS 246 passing current through respective "1" OUT gate conductor 309 or "0" OUT gate conductor 310 respectively. This is the transferral of the vacancy bit from the VACANCY register to the ECHO register under the control of the OFF setting of the TIMING circuit which was referred to with reference to FIG. 1 hereinbefore. If the "1" IN control conductor 305 has current flowing therein, the right path 303 will be resistive, and the left path 304 will be superconducting. Therefore, a gate conductor 311 in series with the SELECT line 260 (for the WORD 1 register) will be made resistive, as will be a gate conductor 312 in series with a rightwardly threading NO MATCH line 313. Similarly, since no current will be flowing through the right path 303, the gate conductor 314 in series with the NO SELECT line 254 will be superconductive as will a gate conductor 315 in series with a rightwardly threading MATCH line 316. It should be noted at this time that the PREVIOUS SELECT line 255, a rightwardly threading OFF OR ENTRY line 111 (which becomes the PREVIOUS MATCH line 317), and all leftwardly threading match lines (including the MATCH line 261, NO MATCH line 259, and PREVIOUS MATCH line 258) are not controlled by the ECHO register. Control over the PREVIOUS MATCH line is necessarily effected in a word register previous in the sequence of registers to the one under consideration. In this case, since we are considering the WORD 1 register, the PREVIOUS SELECT line 255 is merely an extension of the OFF or EXIT line 112.

The leftwardly threading PREVIOUS MATCH, NO MATCH, and MATCH lines are not controlled by the ECHO bit position because, in their leftward path (that is, at the bottom of each word register position as shown in FIGS. 4*d*, 4*e* and 4*f*), these match lines are controlling the exit of tag and data bits, and the entrance of a vacancy bit during an EXIT operation; however, the MATCH line 316 and NO MATCH line 313, as they travel rightwardly through the center of the WORD 1 register, are operated upon to determine which of these lines will have current flowing therein within the WORD 1 register.

From the foregoing it can be seen that the ECHO bit position controls the flow of current into either the SELECT line 260 or the NO-SELECT line 254, alternatively, and will also control the flow of current through either the MATCH line 316 or the NO-MATCH line 313. Since the ECHO register will have a "1" stored therein if the register is occupied, and a "0" stored therein if the register is vacant, it follows that the SELECT line will be conducting if the register is vacant. During an entry operation, the first vacant register is to be selected and, therefore, current flowing in the SELECT line within a vacant word register causes that register to be selected to have data stored therein. Similarly, the MATCH line 316 may have current flowing therein only if the register is occupied, and the NO-MATCH line 313 may have current flowing therein if the register is vacant; this causes the memory to recognize in an EXIT operation only those matching tags which are found within occupied registers, disregarding those which are found in vacant registers. As before described with reference to FIG. 1, it is in part this feature of the associative memory which permits the successive sequential retrieval of data with similar tags.

Current which passes through either of the IN gate conductors 305 and 306 from the lines 307, 308 will then pass downwardly into an extension 319 of the EXIT BUS 246 which passes downwardly into the WORD 2 VACANCY register. The EXIT BUS 246 will cause the transfer of information from the WORD 2 VACANCY register into the WORD 2 ECHO register in the same manner that it caused transfer of data from the WORD 1 VACANCY register to the WORD 1 ECHO register, as just described. In summation, a vacancy bit of "1" or "0" will be placed into the VACANCY ENTRY register by the computer in dependence upon whether a word is to be retained in memory or not. Of course, if the word is being stored in the memory (an ENTRY operation), it is always desired to cause that information to be retained for future reference, and the computer will therefore always be programmed to supply a vacancy bit of "1" during an ENTRY operation. When data is to be retrieved from the computer through an EXIT operation, the computer may supply either a "1" or a "0" to the vacancy register to cause said register to indicate that the data is to be retained for future use or not, by setting the register to "1" to indicate occupancy or to "0" to indicate vacancy, respectively. Since the "1" BUS 241 and "0" BUS 243 respond to an ON line 105 (FIG. 4*a*), data is transferred from the VACANCY ENTRY register during the ON time, and since the "1" OUT and "0" OUT gate conductors 309, 310 in the vacancy register are energized by the EXIT BUS 246, which is an extension of the OFF line 106, data is transferred from the vacancy register to the ECHO register during OFF time. Since the EXIT BUS for the WORD 2 register is an extension of the EXIT BUS for the WORD 1 register, etc., transferral of each VACANCY register into the related ECHO register takes place simultaneously. Of course, if no new vacancy bit has been entered into any one VACANCY register (as is the case in all word registers except that one which is selected during a present ENTRY or EXIT operation) there will be no actual change in the vacancy bit stored in the ECHO register, it already having seen set to correspond to the related VACANCY register during its last ENTRY or EXIT operation. The ECHO register will cause either the SELECT line or the NO SELECT line to carry current throughout that entire word register during an ENTRY operation, and will similarly cause the MATCH line and NO-MATCH line to carry current to that word register during an EXIT operation. It is this control over the SELECT, NO SELECT, MATCH and NO MATCH lines which is the heart of this memory apparatus.

TAG CIRCUITS

*Entry and exit of tag information*

As before described, the tag portion of a word is used to identify that word when stored in memory to make possible a future retrieval of the particular word. During an ENTRY operation, the tag of the particular word being stored must be entered into the tag register positions of the word register within which the information is being stored. On an EXIT operation, however, the tag information is not entered into the word register, but rather is compared with all of the word registers in order to select that word register which has the correct set of tags. Therefore, the tag entry registers serve the function of a buffer register for entering tags into the tag register positions of any one of the word registers, and also serve the function of a buffer register to contain the tags of desired words while comparison is made with the tags in all of the word registers.

Recalling the description of the ON line 105 and the OFF line 106 with reference to FIG. 1, these lines assist in the transfer of vacancy information as described in the preceding section, they then thread to the rightward at the bottom of FIG. 1 to control the flow of data into and out of the EXIT register; the lines then travel upward at the right-hand end of FIG. 1, enter the "1" entry register and travel to the left through each of the tag and data ENTRY registers. The OFF line 106 and ON line 105 are shown entering the upper right-hand side of FIG. 4*c*. These lines go to the left (as before described) through each of the data entry registers (FIG. 4*c*) and then to the left through each of the tag entry registers (FIG. 4*b*). Referring to the TAG ENTRY registry shown at the left half of FIG. 4*b*, current will flow from a source 400 downward and through either a gate conductor 401 of a cryotron controlled by the OFF line 106 or slightly to the right downward and through the gate conductor 402 of a cryotron which is controlled by the ON line 105. As explained previously, with the TIMING circuit OFF, the flow of information is from the computer into the ENTRY register and from the EXIT register into the computer. At this time, the gate conductor 401 is blocked as a result of current flowing in the OFF line 106, so current flows from the source 400 through the gate conductor 402 and through a TAG *t* INPUT switch 403. This switch illustrates the same sort of device described in connection with the TIMING switch 201 hereinbefore. Depending upon whether the tab bit under consideration is a "1" or a "0," the switch will be connected to the right or left, causing current to flow downward to a control conductor 404 of a right read-in cryotron or a control conductor 405 of a left read-in cryotron, respectively. Depending respectively upon which of these control conductors has current flowing therein, the TAG *t* ENTRY register flip-flop comprising a pair of cryotrons 406, 407 will be set to contain either a "1" or a "0." If a "1" is entered into the flip-flop, current will flow in a left path 408; similarly, if a "0" is entered into the flip-flop, current will flow in a right path 409. Current flows upward on a line 410 (in FIG. 4*b*) through a junction 411 where it then will go upward on the right path 409, or flow through the control conductor of the flip-flop cryotron 406 and thence to the left and upward through the left path 408. The left path 408 after passing through the flip-flop cryotron 407 turns and goes downward on a "1" TAG COMPARE line 412; similarly, the right path 409, after passing through the flip-flop cryotron 407, goes upward over to the right and downward on a "0" TAG COMPARE line 413. The input current which flows from the source 400, through the TAG *t* INPUT switch 403 and either of the read-in control gates 404 or 405, flows upwardly through a gate conductor 414 which is controlled by the ON line 105 over to the right and downward on an ENTRY BUS 415. The current in the ENTRY BUS flows downward through each word register in succession (through FIGS. 4*e*, 4*h*, 4*k* and 4*n*) to the TAG *t* EXIT register shown at the left-hand side of FIG. 4*p*, where it reaches the gate conductor 460 of a cryotron controlled by the OFF line 106, which of course is blocked during OFF time, so that it travels slightly to the left and upward through a now superconductive gate conductor 461 of a cryotron controlled by the ON line to supply current to the output gate conductors 462, 463 of the TAG *t* EXIT register. The current through either gate 462, 463 flows through a respective OUTPUT coil 468, 469 and then to the negative source 464. The coils 468, 469 are shown as any form of magnetic device to illustrate that they are not a part of a memory, but are rather devices which respond thereto, in actual practice the coils 468, 469 would most likely be control conductors of cryotrons which selectively pass current to and from the computer or other equipment. Any output compatible with the before-described operation of the cryogenic memory apparatus could be used as desired.

*Transfer into a tag register*

The transfer of the contents of the TAG ENTRY register into the first vacant word register will take place during an ENTRY operation, with the TIMING circuit ON. The first vacant word register will be selected (as before described) by the vacancy circuits in conjunction with the SELECT, NO SELECT, and PREVIOUS SELECT lines. The current from the source 400 (FIG. 4*b*) will flow downward until it approaches a gate conductor 416 of a cryotron which is being made resistive by current in the ENTRY line 109. The current will, therefore, flow to the right on a line 417, upward, and (unless no word register is selected as described more fully hereinafter) through either a gate conductor 418 of a right cryotron into a "1" OUT line 419, or through a gate conductor 420 of a left cryotron into a "0" OUT line 421, depending on whether the bit stored in a TAG *t* ENTRY register is a "1" or a "0" respectively. The current in the "1" OUT line 419 passes downward through the now superconducting gate conductor 422 of a cryotron controlled by the OFF or exit line 112 onto a "1" BUS line 423; alternatively, current flows from the "0" OUT line 421 through a gate conductor 424 onto a "0" BUS line 425, depending on the bit being a "1" or a "0" respectively. The current in the "1" BUS and "0" BUS tends to flow downward until it reaches the selected register.

Within the selected register (FIG. 4*e*, WORD 1 in this example), current will be flowing in the related SELECT line 260, but not in the NO-SELECT line 254 nor the PREVIOUS SELECT line 255. Therefore, current in the "1" BUS or "0" BUS will be able to pass through either a pair of gate conductors 426 (if a "1" or a pair of gate conductors 427 (if a "0"). Current will pass from the "1" BUS or the "0" BUS downward and through a control conductor 428 of a right input cryotron or through a control conductor 429 of a left input cryotron, respectively. The current then flows upward on a line 430, over to the right, and downward on the ENTRY BUS line 415, which will be conductive through each successive word register, since the SELECT line in each of these registers is not carrying current, the WORD 1 register having been selected. When the current flowing in the ENTRY BUS 415 reaches the TAG *t* EXIT register (FIG. 4*p*), it will find that the gate conductor 461 of the cryotron controlled by the ON line 105 is resistive, but the gate conductor 460 of the cryotron controlled by the OFF line 106 is superconductive, so current will flow to a negative source 464 at the bottom of FIG. 4*p*. This is an example of the complementary control required in the use of single-crossing cryotrons. It can be noted at this time that current can flow in the TAG-COMPARE lines 412, 413 at all times since their function (to be described hereinafter) will not interfere with any of the operations of the memory. Each of the other columns of tag circuits (only TAG 1 is shown) operate in a manner identical to that of the TAG *t* column of circuits. It is to be noted that the vacancy bit will be transferred from the VACANCY-ENTRY register into the WORD 1 VACANCY register at the same time that the tag bit is transferred from the TAG *t* ENTRY register into the WORD 1 TAG *t* register just described. This transfer of information takes place during ON time of an ENTRY operation, and the ECHO register has maintained the indication that the WORD 1 register is vacant throughout this operation. When the timing circuit switches once again to OFF the vacancy bit stored in the WORD 1 VACANCY register will be transferred to the WORD 1 ECHO register causing the WORD 1 register to be indicated as occupied thereafter, as before described.

*Tag comparison and transfer from a tag register*

Considering the operation of the tag circuits during an EXIT operation, it will be recalled that the tag in the various tag bit positions of the entry register will be compared with the tag in each corresponding bit position of all of the word registers in order to select the word register having the proper tag. The tag stored in the entry register is not transferred into the tag bit positions of the corresponding word register; the tag is only being compared for purposes of selection, as before described. At the start of an exit operation, the OFF line 106 and ENTRY line 109 (FIG. 4*b*) are not conducting, so current will leave the source 400 (at the top of FIG. 4*b*) and flow downward through the gate conductor 401, downward and through the gate conductor 416 and onto an EXIT BUS line 431. The EXIT BUS line 431 continues downward (FIG. 4*e*) and, assuming that the WORD 1 register has the proper tag in the illustration being given, current will be blocked by a resistive gate conductor 432 which is controlled by current flowing in the MATCH line 261. This current will therefore flow over a line 433 to the right, upward and through either a gate conductor 434 (if the tag bit is a "1") or a gate conductor 435 (if the tag bit is a "0"), downward through either of two now superconductive pairs of gate conductors 436 (for a "1") or 437 (for a "0") to the "1" BUS or "0" BUS 423, 425 respectively. Current will flow downward through one of the BUS lines 423, 425 until it gets to the TAG *t* EXIT register (FIG. 4*p*) where it will pass through either a control conductor 465 of right read-in cryotron or a control conductor 466 of a left read-in cryotron, depending on whether the bit being read into the exit register is a "1" or a "0," respectively. The current then continues out a common center line 467 upward, to the right and down the ENTRY BUS line 415 to the negative source 464.

As just described, the WORD 1 register was selected to have its data transferred into the EXIT register by virtue of the fact that current was flowing in the MATCH line 261, and not in the PREVIOUS MATCH line 258 or NO MATCH line 259. Of course, the PREVIOUS MATCH line for the WORD 1 register will have current flowing therein only during OFF time or during an ENTRY operation, since the WORD 1 PREVIOUS MATCH line is merely an extension of the OFF OR ENTRY line 111. The selection of either the MATCH line 316 or the NO MATCH line 313 is made in part by the ECHO register and in part by the tag compare circuits in the tag registers. Current enters the EXIT line 110 at the right of FIG. 4*d* and passes through the ECHO register; if the WORD 1 register is vacant, the gate conductor 315 will be resistive and current will flow through the gate conductor 312 into the NO MATCH line 313. But in the instant case, assuming that the WORD 1 register is occupied, the gate conductor 312 will be resistive and current will pass through the gate conductor 315 onto the MATCH line 316. Current, therefore, enters the left side of FIG. 4*e* on the match line 316. There are two matching lines 440, 441 and two mismatch lines 442, 443 through which the current on the MATCH line 316 may travel. If current passes through either one of the matching lines 440, 441 it will return to the match line of the WORD 1 register 316 to test the next lower tag bit position in the WORD 1 register, which is the TAG 1 register (shown on the right side of FIG. 4*e*). On the other hand, if current flows through either of the mismatch lines 442, 443 it will then pass back onto the NO MATCH line 313 for the WORD 1 register and preclude the possibility of any matching current flowing through the WORD 1 register. It will be obvious from the symmetry of the circuits in the TAG *t* and TAG 1 registers that in order for current to flow on the MATCH line 316 after leaving the lowest tag position (TAG 1), it must successively pass through either of the matching lines 440, 441 in each and every one of the tag bit positions in the memory WORD 1 register. Passing through any one of the mismatch lines 442, 443 will cause current to flow (from that tag bit position onward) in the NO MATCH line 313. Recalling the description of the current flow in the tag compare lines 412 and 413 which enter the top center of the TAG *t* register, current will be flowing on one or the other of these lines continuously, just as current in the WORD 1 TAG *t* trigger is flowing in one or the other of the left-right lines 445, 446 continuously. Therefore, as soon as current begins to flow in the match line 316, it will flow in one of the lines 440–443 to compare the TAG *t* bit in the entry register (as determined by current flow in one or the other of the tag compare lines 412, 413) with the TAG *t* bit stored in the WORD 1 register (as indicated by current flowing in either the left or right lines 445, 446). If current is flowing in the tag compare line 412 and the left path 445, (indicating a "1" bit in the ENTRY and WORD 1 registers) four gate conductors 448, 449, 450, 451 which are controlled by these currents will be blocked, and the only one of the paths 440–443 remaining superconductive will be the matching path 440 which will cause current to flow over to the match line 316 and into the TAG 1 compare circuits. Similarly, if current is flowing in the lines 413 and 446 (indicating a "0" in both the ENTRY register and the WORD 1 register), four gate conductors 452–455 will be blocked thereby, and the only superconductive conductors will be those in the matching path 441. Therefore, a match of either both ones or both zeros will cause current to flow over one of the matching lines 440, 441 respectively, to enter the tag compare circuits of the TAG 1 register on the MATCH line 316. Assuming now that a "1" is stored in the TAG *t* ENTRY register and that a "0" is stored in the WORD 1 TAG *t* register, current will flow in the tag compare line 412 and in the right line 446. Therefore, the matching line 441 will be blocked by the gate conductor 449, and the matching line 440 will be blocked by the gate conductor 453. Similarly, the mismatch line 443 will be blocked by the gate conductor 448, leaving only the mismatch line 442 superconductive. Therefore, current will flow from the MATCH line as it enters the left side of the TAG register upward and to the right over the mismatch line 442, downward, and into the NO MATCH line 313 where it will flow rightward through the remainder of the WORD 1 register indicating a mismatch. A similar operation obtains when a "0" is stored in the ENTRY register and a "1" is stored in the WORD 1 register.

Resuming now the example wherein an EXIT operation is being performed and the WORD 1 register is found to have the proper tags, current flows through the WORD 1 register on the MATCH line 316 all the way to the right (see FIG. 1), and then downward and begins to flow leftwardly in a MATCH line 261. Current flowing to the left in the MATCH line 261 will cause the cryotron in each tag and data bit position of the WORD 1 register (i.e., cryotron 432 in the WORD 1 TAG *t* position) to become resistive, forcing current into the readout cryotron pair of each register as before described in the EXIT operation of the TAG position of the WORD 1 register. If either the PREVIOUS MATCH line 258 or the NO MATCH line 259 has current flowing therein, the EXIT BUS current in lines corresponding to the EXIT BUS line 431 for the TAG positions will pass downwardly to registers subsequent to the WORD 1 register, and the possibility of having current flow outward through either of the output cryotrons in any of these registers is rendered impossible by the current flowing through each of the cryotrons controlled by the PREVIOUS MATCH line 258 or the NO MATCH line 259, as the case may be (for instance, gate conductor 471–474 in FIG. 4*h*). If none of the registers has matching tags, the NO MATCH line 490 in the WORD *w* register (FIG. 4*m*) will operate a NO MATCH indicator 491, which is similar to the NO VACANCY indicator 274 (FIG. 4*o*). Current through the indicator 491, the MATCH line 492 or the PREVIOUS MATCH line 493 terminates in a negative source 494.

DATA REGISTER CIRCUITS

*Entry and exit of data*

The data registers operate in a manner identical to the storage and retrieval functions of the tag registers, differing, of course, in not having the tag comparison circuits. Specifically, the ON line 105 and OFF line 106 (FIG. 4*c*) carry current to the left (as before described) through each of the data entry registers. Referring to the DATA *d* ENTRY register shown at the left side of FIG. 4*c*, current will flow from a source 500 downward and through either a gate conductor 501 of a cryotron controlled by the OFF line 106 or slightly to the right downward and through the gate conductor 502 of a cryotron which is controlled by the ON line 105. As explained previously, with the TIMING circuit OFF, the flow of information is from the computer into the ENTRY register and from the EXIT register to the computer. At this time, the gate conductor 501 is blocked as a result of current flowing in the OFF line 106, so current flows from the source 500 through the gate conductor 502 and through a DATA *d* INPUT switch 503. Depending upon whether the data bit under consideration is a "1" or a "0," the switch will be connected to the right or left, causing current to flow downward to a control conductor 504 of a right read-in cryotron or a control conductor 505 of a left read-in cryotron, respectively. Depending respectively upon which of these control conductors has a current flowing therein, the DATA *d* ENTRY register flip-flop comprising a pair of cryotrons 506, 507 will be set to contain either a "1" or a "0." If a "1" is entered into the flip-flop, current will flow in a left path 508; similarly, if a "0" is entered into the flip-flop, current will flow in a right path 509. Current flows upward on a line 510 (in FIG. 4*c*) through a junction 511 from whence it will flow upward on the right path 509, or flow through the control conductor of the flip-flop cryotron 506 and thence to the left and upward through the left path 508. The left path 508 after (passing through the flip-flop cryotron 507) terminates in a positive source 512; similarly, the right path 509 (after passing through the flip-flop cryotron 407) joins the left path and terminates in the positive source 512. The input current which flows from the source 500 through the DATA *d* INPUT switch 503 and either of the read-in control gates 504 or 505, flows upwardly through a gate conductor 514 which is controlled by the ON line 105 over to the right and downward on an ENTRY BUS 515. The current in the ENTRY BUS 515 flows downward through each word register in succession (through FIGS. 4*f*, 4*i*, 4*l* and 4*o*) until it reaches the DATA *d* EXIT register shown at the left-hand side of FIG. 4*q*, where it reaches the gate conductor 560 of a cryotron controlled by the OFF line 106, which of course is blocked during OFF time, so that it travels slightly to the left and upward through a now superconductive gate conductor of a cryotron controlled by the ON line 105 to supply current through the output gate conductors 562, 563 of the DATA *d* EXIT register to respective OUTPUT coils 568, 569.

*Transfer into a data register*

The transfer of the contents of the DATA *d* ENTRY register into the first vacant word register will take place during an ENTRY operation, with the timing circuit ON, simultaneously with the transfer of tag information, described hereinbefore. The first vacant word register will be selected by the SELECT, NO SELECT and PREVIOUS SELECT lines. The current from the source 500 (FIG. 4*c*) will flow downward until it is blocked by a gate conductor 516 of a cryotron which is being made resistive by current in the ENTRY line 109. The current will, therefore flow to the right on a line 517, upward, and (unless no word register is selected, as described more fully hereinafter) through either a gate conductor 518 of a right cryotron into a "1" OUT line 519, or through a gate conductor 520 of a left cryotron into a "0" OUT line 519, or through a gate conductor 520 of a left cryotron into a "0" OUT line 521, depending on whether the bit stored in a DATA *d* ENTRY register is a "1" or a "0" respectively. The current in the "1" OUT line 519 passes downward through the now superconducting gate conductor 522 of a cryotron controlled by the OFF or EXIT line 112 onto a "1" BUS line 523; alternatively, current flows from the "0" OUT line 521 through a gate conductor 524 onto a "0" BUS line 525, depending on the bit being a "1" or a "0" respectively. The current in the "1" BUS or "0" BUS tends to flow downward until it reaches the selected register.

Within the selected register (FIG. 4*f*, WORD 1 in this example), current will be flowing in the related SELECT line 260, but not in the NO SELECT line 254 not the PREVIOUS SELECT line 255, therefore, current in the "1" BUS or "0" BUS will be able to pass through either a pair of gate conductors 526 (if a "1") or a pair of gate conductors 527 (if a "0"). Current will pass from the "1" BUS or the "0" BUS downward and through a control conductor 528 of a right input cyrotron or through a control conductor 529 of a left input cryotron, respectively. The current then flows upward on a line 530, over to the right and downward on the ENTRY BUS line 515, which will be conductive through each successive word register, since the SELECT line in each of these registers is not carrying current, the WORD 1 register having been selected. When the current flowing in the ENTRY BUS 515 reaches the DATA *d* EXIT register (FIG. 4*q*), it will find that the gate conductor 561 of the cryotron controlled by the ON line 105 is resistive, but the gate conductor 560 of the cryotron controlled by the OFF line 106 is superconductive, so current will flow to a negative source 464 at the bottom of FIG. 4*q*. Each of the other columns of tag data circuits (only DATA 1 is shown) operate in a manner identical to that of the DATA *d* column of circuits.

*Transfer from a data register*

As described for the tag circuits hereinbefore, at the start of an EXIT operation, the OFF line 108 and ENTRY line 109 (FIG. 4*c*) are not conducting, so current will leave the source 500 (at the top of FIG. 4*c*) and flow downward through the gate conductor 501, through the gate conductor 516 and onto an EXIT BUS line 531. The EXIT BUS line 531 continues downward in (FIG. 4*f*) and, assuming again that the WORD 1 register has the proper tag in the illustration being given, current will be blocked by a resistive gate conductor 532 which is controlled by current flowing in the MATCH line 261. This current will therefore flow over a line 533 to the right, upward and through either a gate conductor 534 (if the data bit is a "1") or a gate conductor 535 (if the tag bit is a "0") downward through either of two now superconductive pairs of gate conductors 536 (for a "1") or 537 (for a "0") to the "1" BUS or "0" BUS 523, 525, respectively. Current will flow downward through one of the BUS lines 523, 525 to the DATA *d* EXIT register (FIG. 4*q*) where it will pass through either a control conductor 565 of a right read-in cryotron or a cryotron control conductor 566 of a left read-in cryotron, depending on whether the bit being read into the exit register is a "1" or a "0" respectively. The current then continues out a common center line 567 upward to the right and down the ENTRY BUS line 515 to the negative source 564.

Returning now to FIG. 4*f*, current flowing to the left in the MATCH line 261 will cause the cryotron in each data bit position of the WORD 1 register (i.e., cryotron 532 in WORD 1 DATA *d*) to become resistive, forcing current into the read-out cryotron pair of each register as just described in the EXIT operation of the DATA *d* position of the WORD 1 register. If either the PREVIOUS MATCH line 258 or the NO MATCH line 259 has current flowing therein, the EXIT BUS current in lines corresponding to the EXIT BUS line 531 for the DATA *d* position will pass downwardly to registers subsequent to the WORD 1 register and the possibility of having current flow outward through either of the output cryotrons in any of these registers is rendered impossible by the current flowing through each of the cryotrons controlled by the PREVIOUS MATCH line 258 or the NO MATCH line 259 as the case may be (for instance, gate conductors 571–574 in FIG. 4*i*).

While our invention has been particularly shown and described with reference to a preferred embodiment thereof, it will be understood by those skilled in the art that the foregoing and other changes in form and details may be made therein without departing from the spirit and scope of our invention.

We claim:

1. In an associative memory of the kind in which groups of data bits stored in random ones of a sequence of registers are identified by a tag portion of each group, and in which the tag of a group which is to be retrieved from memory is compared with the tags of one or more of the groups stored therein, a control device for selecting the one of said registers from which data is to be retrieved, comprising: a vacancy control means for each of said registers, each including a vacancy designating means and an occupancy designating means alternatively operable in dependence on whether the corresponding register is vacant or occupied, respectively; a tag comparing means for each of said registers, each responsive to the occupancy designating means of the corresponding register, each including a match responsive means and a mismatch responsive means alternatively operable in dependence on whether the tag of the desired group and the tag of the group stored in the corresponding register are identical or not, respectively; a read-out means for each of said registers, each operable in response to the corresponding one of said match responsive means to retrieve data from the corresponding register; a connection means for each register subsequent to the first one in said sequence, each concurrently responsive to the mismatch responsive means and the vacancy designating means of the register antecedent thereto in said sequence to operate the one of said vacancy control means corresponding to said subsequent register; and initiating means to start a retrieval operation by operating the vacancy control means of the first register in said sequence.

2. A sequential associative memory of the kind in which groups of data bits stored in random ones of a sequence of registers are identified by a tag portion of the group, and in which the tag of a group which is to be retrieved from memory is compared with the tags of one or more of the groups stored therein, comprising: a pair of vacancy control means for each of said registers, each vacancy control means including a vacancy designating means and an occupancy designating means alternatively operable in dependence on whether the corresponding register is vacant or occupied, respectively; a plurality of writing means, one for each of said registers, each responsive to a first vacancy designating means of the corresponding register to enter data into said corresponding register; a writing connection means for each register subsequent to the first one in said sequence, each concurrently responsive to a first occupancy designating means of the register antecedent thereto in said sequence to operate a first one of said vacancy control means corresponding to said subsequent register; writing initiating means to start a writing operation by operating a first one of the vacancy control means of the first register in said sequence; a tag comparing means for each of said registers, each responsive to a second one of the occupancy designating means of the corresponding register, each including a match responsive means and a mismatch responsive means alternatively operable by said second occupancy designating means in dependence on whether the tag of the desired group and the tag of the group stored in the corresponding register are identical or not, respectively; a read-out means for each of said registers, each operable in response to the corresponding one of said match responsive means to retrieve data from the corresponding register; a read-out connection means for each register subsequent to the first one in said sequence, each concurrently responsive to the mismatch responsive means and a second one of the vacancy designating means of the register antecedent thereto in said sequence to operate a second one of said vacancy control means corresponding to said subsequent register; and read-out initiating means to start a retrieval operation by operating a second one of the vacancy testing means of the first register in said sequence.

References Cited by the Examiner

UNITED STATES PATENTS

| | | | |
|---|---|---|---|
| 2,771,595 | 11/56 | Hendrickson et al. | |
| 2,946,986 | 7/60 | Harrison | 340—172.5 |
| 2,988,735 | 6/61 | Everett | 340—174.1 |

OTHER REFERENCES

Page 157, 1959, Jeenel: Programming for Digital Computers, McGraw-Hill.

MALCOLM A. MORRISON, *Primary Examiner.*

IRVING L. SRAGOW, *Examiner.*